US010977457B2

(12) United States Patent
Sekiya

(10) Patent No.: US 10,977,457 B2
(45) Date of Patent: Apr. 13, 2021

(54) INFORMATION PROCESSING SYSTEM AND METHOD, AND INFORMATION PROCESSING DEVICE AND METHOD

(71) Applicant: SONY CORPORATION, Tokyo (JP)

(72) Inventor: Shuichi Sekiya, Saitama (JP)

(73) Assignee: SONY CORPORATION, Tokyo (JP)

( * ) Notice: Subject to any disclaimer, the term of this patent is extended or adjusted under 35 U.S.C. 154(b) by 781 days.

(21) Appl. No.: 15/543,317

(22) PCT Filed: Jan. 15, 2016

(86) PCT No.: PCT/JP2016/051083
§ 371 (c)(1),
(2) Date: Jul. 13, 2017

(87) PCT Pub. No.: WO2016/121524
PCT Pub. Date: Aug. 4, 2016

(65) Prior Publication Data
US 2018/0004987 A1 Jan. 4, 2018

(30) Foreign Application Priority Data
Jan. 30, 2015 (JP) .............................. JP2015-017409

(51) Int. Cl.
G06K 7/10 (2006.01)
G06Q 20/34 (2012.01)
(Continued)

(52) U.S. Cl.
CPC ......... G06K 7/10366 (2013.01); G06N 5/022 (2013.01); G06Q 10/02 (2013.01);
(Continued)

(58) Field of Classification Search
CPC .... G06K 7/10366; G06N 5/022; G06Q 10/02; G06Q 20/065; G06Q 20/0855; G06Q 20/343; G06Q 20/355; G06Q 50/30
See application file for complete search history.

(56) References Cited

U.S. PATENT DOCUMENTS

2004/0064453 A1* 4/2004 Ruiz ........................ G06F 21/32
2005/0023345 A1* 2/2005 Furuyama ............. G07F 7/0866
235/382

(Continued)

FOREIGN PATENT DOCUMENTS

CN 1574989 A 2/2005
JP 2005-329835 A 12/2005
(Continued)

OTHER PUBLICATIONS

Business Editors, "U.S. Open Tees Off With Wireless Gate Admissions System; Compsee Designs Versatile, High-Volume Ticket Entry System," Business Wire, 1, New York, Jun. 12, 2002.*

(Continued)

Primary Examiner — Nathan Erb
(74) Attorney, Agent, or Firm — Chip Law Group

(57) ABSTRACT

The present technology relates to information processing system and method, and information processing device and method for realizing a system capable of increasing efficiency while reducing load concentration. Each of the information processing system and method and the information processing device and method according to an aspect of the present technology belongs to one or more center servers. One or more gate controllers different from each other are allocated. Acquired is user data that relates to data about a user corresponding to identification data, and is supplied on the basis of prediction data corresponding to the identification data. Acquired is the identification data that is read from a storage device storing the identification data, and is (Continued)

supplied from the gate controller allocated to the corresponding system, method or device. The acquired user data that corresponds to the acquired identification data is processed. For example, the present technology is applicable to an information processing device or an information processing system.

19 Claims, 17 Drawing Sheets

(51) Int. Cl.
* G06Q 20/08 (2012.01)
* G06Q 50/30 (2012.01)
* G06N 5/02 (2006.01)
* G06Q 10/02 (2012.01)
* G06Q 20/06 (2012.01)

(52) U.S. Cl.
CPC ....... *G06Q 20/065* (2013.01); *G06Q 20/0855* (2013.01); *G06Q 20/343* (2013.01); *G06Q 20/355* (2013.01); *G06Q 50/30* (2013.01)

(56) References Cited

U.S. PATENT DOCUMENTS

| | | | | |
|---|---|---|---|---|
| 2008/0052402 | A1* | 2/2008 | Carlinet | H04L 63/1458 709/229 |
| 2010/0309051 | A1* | 12/2010 | Moshfeghi | H04W 64/006 342/378 |
| 2014/0292478 | A1* | 10/2014 | Henson | G06Q 20/045 340/5.31 |

FOREIGN PATENT DOCUMENTS

| | | |
|---|---|---|
| JP | 2013-228884 A | 11/2013 |
| JP | 2014-213697 A | 11/2014 |

OTHER PUBLICATIONS

International Search Report and Written Opinion of PCT Application No. PCT/JP2016/051083, dated Mar. 29, 2016, 01 pages of English Translation and 06 pages of ISRWO.

Office Action for CN Patent Application No. 201680006668.4, dated Jul. 27, 2020, 14 pages of Office Action and 18 pages of English Translation.

* cited by examiner

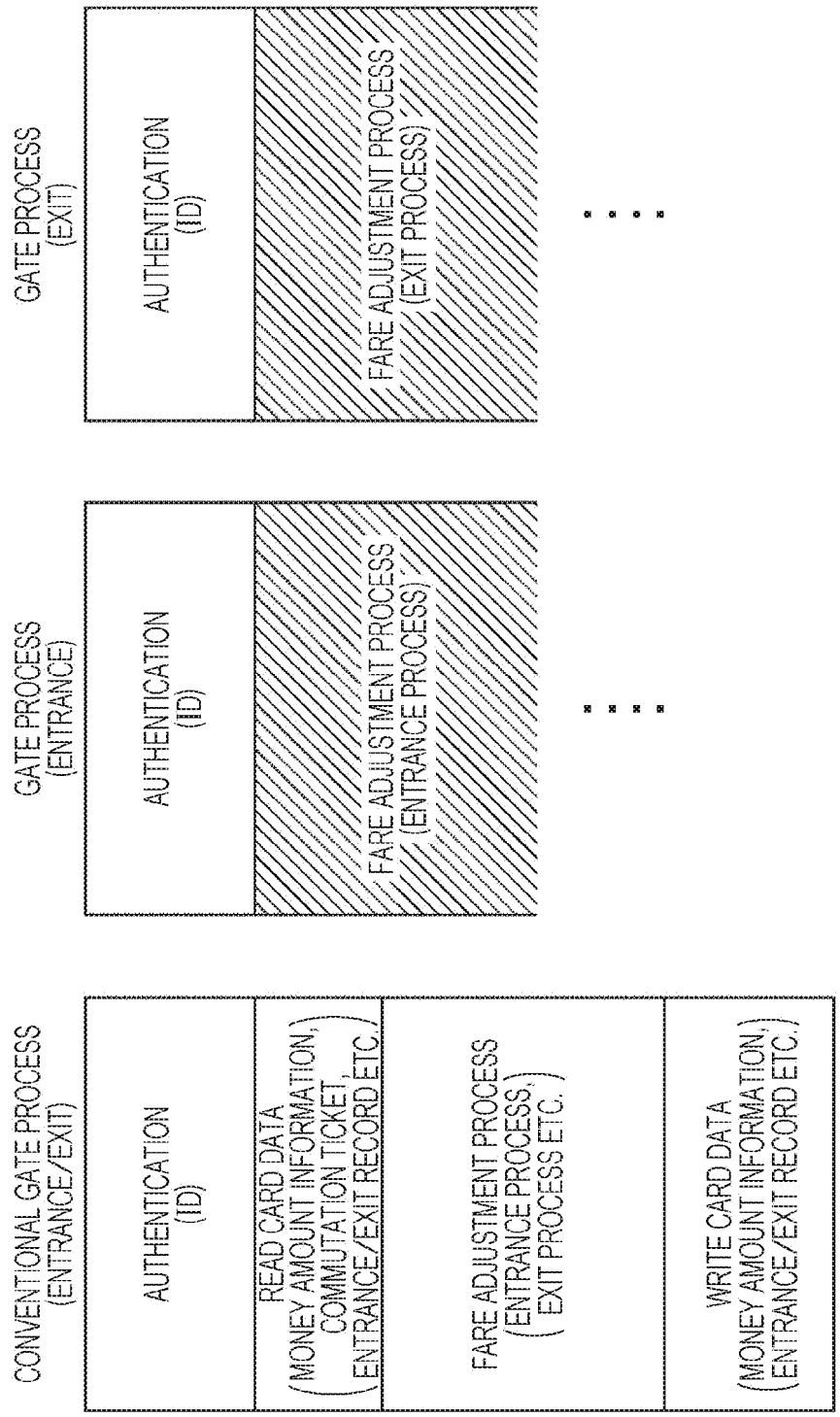

INFORMATION PROCESSING SYSTEM AND METHOD, AND INFORMATION PROCESSING DEVICE AND METHOD

CROSS REFERENCE TO RELATED APPLICATIONS

This application is a U.S. National Phase of International Patent Application No. PCT/JP2016/051083 filed on Jan. 15, 2016, which claims priority benefit of Japanese Patent Application No. JP 2015-017409 filed in the Japan Patent Office on Jan. 30, 2015. Each of the above-referenced applications is hereby incorporated herein by reference in its entirety.

TECHNICAL FIELD

The present technology relates to information processing system and method, and information processing device and method, and more particularly to information processing system and method, and information processing device and method for realizing a system capable of increasing efficiency while reducing concentration of loads.

BACKGROUND ART

Various types of information processing systems have been currently used in transportation facilities such as railroads. For example, there has been a fare adjustment system which manages entrance and exit of a user at an automatic ticket gate by using an integrated circuit (IC) card on which commutation ticket data, electronic money and the like are registered, and adjusts a fare or the like. There has also been a congestion degree information gathering and distributing system which manages entrance and exit of a user, and recognizes and utilizes a flow of a user, a degree of congestion and the like (for example, see Patent Document 1).

CITATION LIST

Patent Document

Patent Document 1: Japanese Patent Application Laid-Open No. 2014-213697

SUMMARY OF THE INVENTION

Problems to be Solved by the Invention

According to the conventional fare adjustment system described above, however, many processes relating to entrance/exit management and fare adjustment are performed at each of automatic ticket gates. In this case, efficiency of the system may lower due to excessive deconcentration of processing.

Generally, system efficiency increases when processes are performed by a smaller number of devices such as servers. For increasing efficiency of the fare system described above, it is similarly preferable that processes such as entrance/exit management and fare adjustment are performed by a server to which the respective automatic ticket gates belong. For example, respective processes such as prediction and aggregate calculation of shifts of users are performed by an analysis server in the congestion degree information gathering and distributing system described in Patent Document 1. Accordingly, efficiency of this system increases.

However, a typical fare adjustment system used in transportation facilities is often constituted by an extremely large-scale system. In this case, a data volume and a processing volume become extremely large, producing considerably complicated processing contents. Accordingly, it has been difficult, in practical situations, for a single server to perform all of these processes in consideration of processing loads and communication traffics.

The present technology has been proposed under the aforementioned circumstances. It is an object of the present technology to increase efficiency of a system while reducing load concentration.

Solutions to Problems

One aspect of the present technology is directed to an information processing system including: one or a plurality of center servers to each of which one or more zone servers are allocated; a plurality of the zone servers each of which belongs to one or more of the center servers, one or more gate controllers different from each other being allocated to each of the zone servers; and a plurality of the gate controllers each of which belongs to the corresponding zone server, and communicates with a storage device. Each of the center servers includes a management unit that manages user data that is data about a user on the basis of identification data. Each of the zone servers includes: a user data acquisition unit that acquires the user data that corresponds to the identification data and is supplied on the basis of prediction data corresponding to the identification data; a first identification data acquisition unit that acquires the identification data from the gate controller allocated to the corresponding zone server; and a user data processing unit that processes the user data that corresponds to the identification data acquired by the first identification data acquisition unit and is acquired by the user data acquisition unit. Each of the gate controllers includes: a second identification data acquisition unit that acquires the identification data from the storage device that stores the identification data; and an identification data supply unit that supplies the identification data acquired by the second identification data acquisition unit to the zone server to which the corresponding gate controller belongs.

The one aspect of the present technology is also directed to an information processing method for an information processing system that includes: one or a plurality of center servers to each of which one or more zone servers are allocated; a plurality of zone servers each of which belongs to one or more of the center servers, one or more gate controllers different from each other being allocated to each of the zone servers; and a plurality of the gate controllers each of which belongs to the corresponding zone server, and communicates with a storage device. Each of the center servers manages user data that is data about a user on the basis of identification data. Each of the zone servers acquires the user data corresponding to the identification data and supplied on the basis of prediction data corresponding to the identification data, acquires the identification data from the gate controller allocated to the corresponding zone server, and processes the acquired user data that corresponds to the acquired identification data. Each of the gate controllers acquires the identification data from the storage device that stores the identification data, and supplies the acquired identification data to the zone server to which the corresponding gate controller belongs.

A further aspect of the present technology is directed to an information processing device that belongs to one or more center servers, one or more gate controllers being allocated to the information processing device. The information processing device includes: a user data acquisition unit that acquires user data that is data about a user corresponding to identification data, and is supplied on the basis of prediction data corresponding to the identification data; an identification data acquisition unit that acquires the identification data that is read from a storage device storing the identification data, and is supplied from the gate controller allocated to the information processing device; and a user data processing unit that processes the user data that corresponds to the identification data acquired by the identification data acquisition unit and is acquired by the user data acquisition unit.

The user data acquisition unit acquires the user data that is supplied, on the basis of the prediction data, from a different information processing device that belongs to one or more center servers, one or more gate controllers different from each other being allocated to the different information processing device.

The user data acquisition unit acquires the user data supplied from the corresponding center server on the basis of the prediction data.

The user data acquisition unit acquires the user data from the corresponding center server in a case where the user data that corresponds to the identification data acquired by the identification data acquisition unit is not supplied.

The prediction data is data used for prediction of the information processing device to which the gate controller belongs, the gate controller subsequently reading the identification data from the storage device. On the basis of the prediction data, the user data acquisition unit acquires the user data supplied in accordance with prediction that the information processing device is the device to which the gate controller belongs, the gate controller subsequently reading the identification data from the storage device.

The prediction data contains data that relates to a behavior history of a user of the storage device that stores the identification data corresponding to the prediction data. On the basis of the data relating to the behavior history of the user, the user data acquisition unit acquires the user data supplied in accordance with prediction that the information processing device is the device to which the gate controller belongs, the gate controller subsequently reading the identification data from the storage device.

The prediction data contains data that relates to a commutation ticket of a user of the storage device that stores the identification data corresponding to the prediction data. On the basis of the data relating to the commutation ticket of the user, the user data acquisition unit acquires the user data supplied in accordance with prediction that the information processing device is the device to which the gate controller belongs, the gate controller subsequently reading the identification data from the storage device.

The user data contains the identification data, and data that relates to a history of entrance and exit of a user. The user data processing unit updates the data that relates to the history of the entrance and exit, and is contained in the user data corresponding to the identification data acquired by the identification data acquisition unit.

The user data further contains data that relates to an amount of registered electronic money. On the basis of entrance or exit of the user corresponding to the identification data acquired by the identification data acquisition unit, the user data processing unit updates the data that relates to the amount of the registered electronic money, and is contained in the user data of the user.

The user data further contains data that relates to a commutation ticket. On the basis of entrance or exit of the user corresponding to the identification data acquired by the identification data acquisition unit, and the data relating to the commutation ticket, the user data processing unit updates the data that relates to the amount of the registered electronic money and is contained in the user data of the user as necessary.

Further provided is a prediction unit that predicts, using the prediction data, the information processing device to which the gate controller belongs, the gate controller subsequently reading the identification data from the storage device. Further provided is a user data supply unit that supplies the user data processed by the user data processing unit to a different information processing device predicted by the prediction unit as the information processing device to which the gate controller belongs, the gate controller subsequently reading the identification data from the storage device.

The user data supply unit further supplies the user data processed by the user data processing unit to the corresponding center server.

The user data contains data that relates to a history of entrance and exit of a user. The identification data acquisition unit acquires data that relates to the history of the entrance and exit of the user, is read from the storage device, and is supplied from the gate controller allocated to the information processing device. The user data processing unit updates the data that relates to the history of the entrance and exit of the user and is contained in the user data corresponding to the identification data, and the data that relates to the history of the entrance and exit of the user and is acquired by the identification data acquisition unit.

The user data contains data that relates to an amount of registered electronic money. The identification data acquisition unit acquires the data that relates to the amount of the registered electronic money, is read from the storage device, and is supplied from the gate controller allocated to the information processing device. The user data processing unit updates the data that relates to the amount of the registered electronic money and is contained in the user data corresponding to the identification data, and the data that relates to the amount of the registered electronic money and is acquired by the identification data acquisition unit.

The user data further contains data that relates to a commutation ticket. The user data processing unit updates the data that relates to the amount of the registered electronic money and is contained in the user data, and the data that relates to the amount of the registered electronic money and is acquired by the identification data acquisition unit as necessary on the basis of entrance or exit of the user and the data relating to the commutation ticket.

The gate controller allocated to the information processing device is provided in a physical area different from a physical area where a gate controller allocated to a different information processing device is provided.

A storage unit that stores the user data is further provided.

The further aspect of the present technology is also directed to an information processing method that belongs to one or more center servers, one or more gate controllers being allocated to the information processing method. The information processing method includes: acquiring user data that relates to data about a user corresponding to identification data, and is supplied on the basis of prediction data corresponding to the identification data; acquiring the identification data that is read from a storage device storing the identification data, and is supplied from the gate controller allocated to the information processing method; and processing the acquired user data that corresponds to the acquired identification data.

According to the one aspect of the present technology, there are provided: one or a plurality of center servers to each of which one or more zone servers are allocated; a plurality of zone servers each of which belongs to one or more of the center servers, one or more gate controllers different from each other being allocated to each of the zone servers; and a plurality of the gate controllers each of which belongs to the corresponding zone server, and communicates with a storage device. Each of the center servers manages user data that is data about a user on the basis of identification data. Each of the zone servers acquires the user data corresponding to the identification data and supplied on the basis of prediction data corresponding to the identification data, acquires the identification data from the gate controller allocated to the corresponding zone server, and processes the acquired user data that corresponds to the acquired identification data. Each of the gate controllers acquires the identification data from the storage device that stores the identification data, and supplies the acquired identification data to the zone server to which the corresponding gate controller belongs.

According to the further aspect of the present technology, each of the information processing device and the information processing method belongs to one or more center servers. One or more gate controllers different from each other are allocated. User data that relates to data about a user corresponding to identification data, and is supplied on the basis of prediction data corresponding to the identification data is acquired. The identification data that is read from a storage device storing the identification data, and is supplied from the allocated gate controller is acquired. The acquired user data that corresponds to the acquired identification data is processed.

Effects of the Invention

According to the present technology, information processing is achievable. In addition, according to the present technology, a system capable of increasing efficiency while reducing load concentration is realizable.

BRIEF DESCRIPTION OF DRAWINGS

FIGS. 9A, 9B and 9C are diagrams showing a comparative example of contents and procedures of the processes.

MODES FOR CARRYING OUT THE INVENTION

Figure 1:
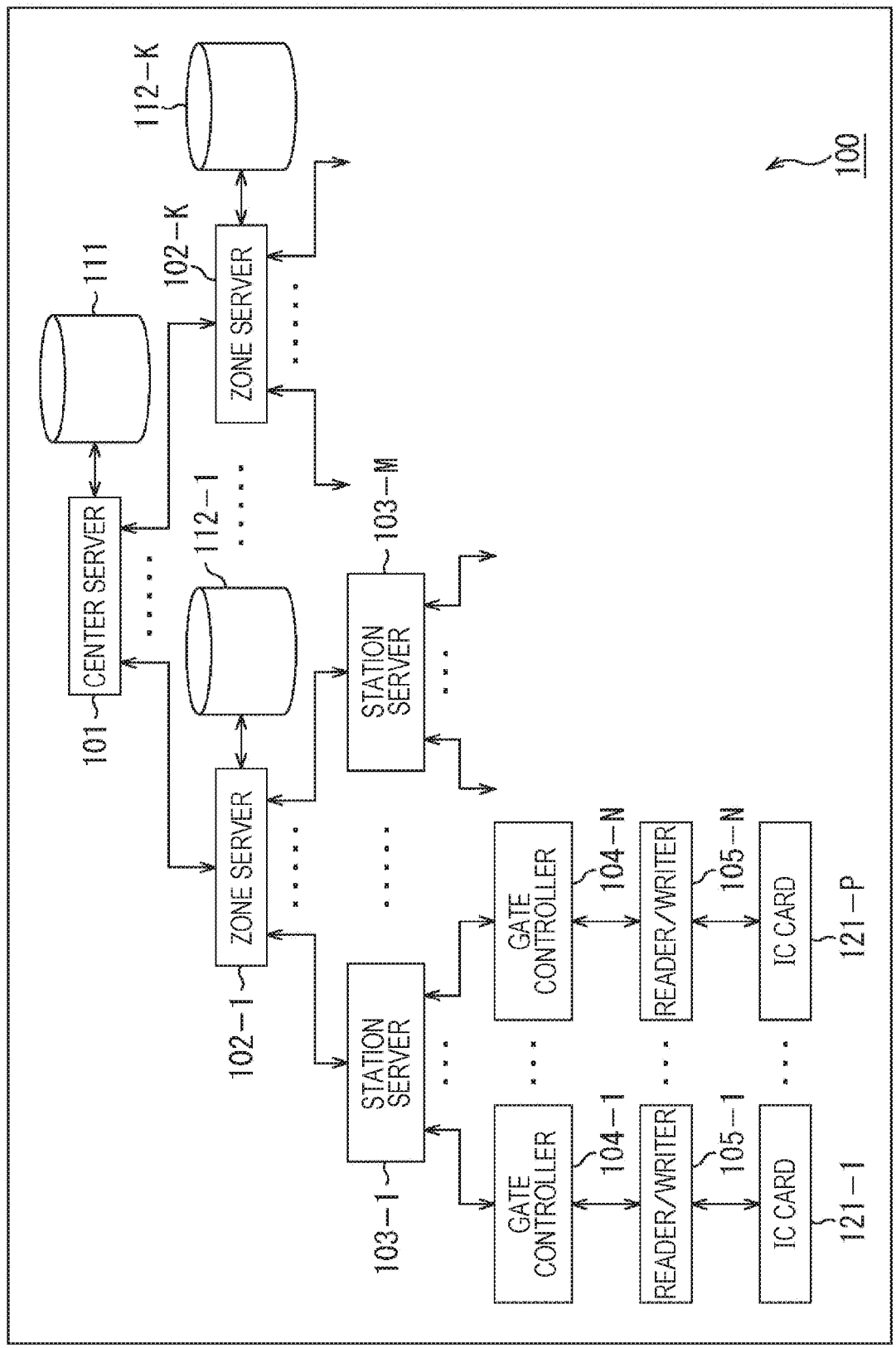
FIG. 1 is a block diagram showing a main configuration example of an information processing system.

Modes for carrying out the present disclosure (hereinafter referred to as embodiments) are described hereinbelow. Note that the description is presented in the following order.
1. First Embodiment (Information Processing System)
2. Second Embodiment (Information Processing System)

1. FIRST EMBODIMENT

<Information Processing System Used in Transportation Facilities or Others>

Various types of information processing systems have been currently used in transportation facilities such as railroads. For example, there has been a fare adjustment system which manages entrance and exit of a user at an automatic ticket gate by using an integrated circuit (IC) card on which commutation ticket data, electronic money and the like are registered, and adjusts a fare or the like. There has also been a congestion degree information gathering and distributing system which manages entrance and exit of a user, and recognizes and utilizes a flow of a user, a degree of congestion and the like, as described in Patent Document 1.

According to the conventional fare adjustment system described above, however, many processes relating to entrance/exit management and fare adjustment are performed at each automatic ticket gate. In this case, efficiency of the system may lower due to excessive deconcentration of processing.

For example, low efficiency may raise costs. According to this type of system, a large number of items of data relating to fare adjustment or the like are stored in an IC card. Accordingly, an automatic ticket gate is required to perform a large number of processes relating to entrance/exit management, fare adjustment or the like within a short period for a user to pass through the automatic ticket gate. In this case, performance required for each automatic ticket gate increases, wherefore costs may rise accordingly. Moreover, a large number of automatic ticket gates of this type are generally equipped in transportation facilities, in which situation costs of the whole system may considerably rise.

Furthermore, the processing volume executable by each automatic ticket gate may be limited. In this case, addition of new services or the like may be difficult under this limitation. For example, a large volume of data such as an entrance/exit record and fare adjustment are recorded on an IC card, wherefore an automatic ticket gate is required to read these items of data from the IC card, or write updated data to the IC card at the time of entrance or exit. In this case, the necessity of a sufficient time for writing or reading of the data may impose a limitation to a time to be spent for other processes, and therefore may impose a limitation to the processing volume executable by the automatic ticket gate. Furthermore, under these limitations, it may be difficult to add new services or system changes which may increase processes to be executed by the automatic ticket gate, or data to be recorded on the IC card. In other words, flexibility of the system may lower.

In addition, data writing or data reading to and from the IC card is performed via unstable wireless communication. In this case, the possibility of processing errors caused by failures or the like may increase as the data volume becomes larger.

In addition, a large volume of processes relating to entrance/exit management and fare adjustment are performed by respective automatic ticket gates. In this case, a larger volume of data needs to be shared between all automatic ticket gates. For example, each automatic ticket gate needs to detect, on the basis of a negative list, a card determined as an unauthorized card in an entrance/exit record, fare adjustment or the like, or a disabled IC card. In this case, the negative list needs to be distributed to all the automatic ticket gates.

In addition, increase in complexity of hardware maintenance and software update may raise costs or difficulty levels. For example, a higher performance automatic ticket gate increases complexity of hardware and software of each automatic ticket gate. In this case, hardware maintenance and software update become more complicated accordingly, and may raise costs and difficulty level of each automatic ticket gate. Moreover, an addition, a change or the like of system configurations or services require update of software for all automatic ticket gates, and may raise costs and difficulty levels accordingly.

In general, processes are more easily performed with easy sharing of information or processes, and easy update and maintenance of a system or software, for example, when the number of devices such as servers to be used is small. In this case, system efficiency improves in many cases. For increasing efficiency of the fare adjustment system described above, it is similarly preferable that processes such as entrance/exit management and fare adjustment are performed by a server managing the respective automatic ticket gates. For example, respective processes such as prediction and aggregate calculation of shifts of users are performed by an analysis server in the congestion degree information gathering and distributing system described in Patent Document 1. Accordingly, efficiency of this system increases.

However, a typical fare adjustment system used in transportation facilities is often constituted by an extremely large-scale system. In this case, a data volume and a processing volume become extremely large, producing considerably complicated processing contents. Accordingly, it has been difficult, in practical situations, for a single server to perform all of these processes in consideration of processing loads and communication traffics.

In case of the foregoing fare adjustment system, for example, only a short processing time is left for processes relating to entrance/exit management, fare adjustment and the like as described above. Accordingly, processing may be delayed when the processing time increases due to a rise of processing loads or communication traffics or for other reasons.

<New System Configuration>

In consideration of the aforementioned problems, provided is an information processing system including: one or a plurality of center servers to each of which one or more zone servers are allocated; a plurality of zone servers each of which belongs to one or more of the center servers, one or more gate controllers different from each other being allocated to each of the zone servers; and a plurality of the gate controllers each of which belongs to the corresponding zone server, and communicates with a storage device. Each of the center servers manages user data that is data about a user on the basis of identification data. Each of the zone servers acquires the user data corresponding to the identification data and supplied on the basis of prediction data corresponding to the identification data, acquires the identification data from the gate controller allocated to the corresponding zone server, and processes the acquired user data that corresponds to the acquired identification data. Each of the gate controllers acquires the identification data from the storage device that stores the identification data, and supplies the acquired identification data to the zone server to which the corresponding gate controller belongs.

For example, an information processing system includes: one or a plurality of center servers to each of which one or more zone servers are allocated; a plurality of the zone servers each of which belongs to one or more of the center servers, one or more gate controllers different from each other being allocated to each of the zone servers; and a plurality of the gate controllers each of which belongs to the corresponding zone server, and communicates with a storage device. Each of the center servers includes a management unit that manages user data that is data about a user on the basis of identification data. Each of the zone servers includes: a user data acquisition unit that acquires the user data that corresponds to the identification data and is supplied on the basis of prediction data corresponding to the identification data; a first identification data acquisition unit that acquires the identification data from the gate controller allocated to the corresponding zone server; and a user data processing unit that processes the user data that corresponds to the identification data acquired by the first identification data acquisition unit and is acquired by the user data acquisition unit. Each of the gate controllers includes: a second identification data acquisition unit that acquires the identification data from the storage device that stores the identification data; and an identification data supply unit that supplies the identification data acquired by the second identification data acquisition unit to the zone server to which the corresponding gate controller belongs.

In other words, an information processing device functioning as a zone server belongs to one or more center servers, one or more gate controllers being allocated to the information processing device. The information processing device acquires user data that is data about a user corresponding to identification data, and is supplied on the basis of prediction data corresponding to the identification data. The information processing device further acquires the identification data that is read from a storage device storing the identification data, and is supplied from the gate controller allocated to the information processing device. The information processing device further processes the acquired user data that corresponds to the acquired identification data.

For example, an information processing device functioning as a zone server belongs to one or more center servers, one or more gate controllers being allocated to the information processing device. The information processing device includes: a user data acquisition unit that acquires user data that is data about a user corresponding to identification data, and is supplied on the basis of prediction data corresponding to the identification data; an identification data acquisition unit that acquires the identification data that is read from a storage device storing the identification data, and is supplied from the gate controller allocated to the information processing device; and a user data processing unit that processes the user data that corresponds to the identification data acquired by the identification data acquisition unit and is acquired by the user data acquisition unit.

According to this configuration, processes are executed by the plurality of zone servers. In this case, reduction of loads on the gate controllers, and reduction of process concentration on the center servers are achievable. Accordingly, a system capable of increasing efficiency while reducing load concentration is realizable.

<Configuration of Information Processing System>

This type of information processing system is more specifically described. FIG. 1 is a block diagram showing a main configuration example of an information processing system according to an embodiment of an information processing system to which the present technology has been applied. An information processing system 100 shown in FIG. 1 is a system which manages entrance and exit of users. The information processing system 100 may be used for any purposes of use, such as transportation facilities including passenger railroads, buses, and airplanes, and other facilities and services including highways, parking lots, event halls, and hotels. The information processing system 100 may further adjust charges and fares in a case of being provided for charged facilities or services.

Discussed hereinbelow is an example which uses the information processing system 100 for assisting user entrance/exit management and fare adjustment for passenger railroads.

As illustrated in FIG. 1, the information processing system 100 includes a center server 101. While only the single center server 101 is shown in FIG. 1, any number of the center servers 101, such as a plurality of center servers 101, may be provided.

The center server 101 performs a process relating to management of user data, i.e., data about a user, on the basis of identification data, for example.

The information processing system 100 further includes a plurality of zone servers 102. While the K (K: 2 or larger natural number) zone servers 102 (zone servers 102-1 through 102-K) are shown in FIG. 1, the number of the zone servers 102 may be any numbers as long as a plurality of the zone servers 102 are provided. Each of the zone servers 102 belongs to the center server 101. The plurality of zone servers 102 therefore belong to the one center server 101. In other words, the plurality of zone servers 102 are allocated to the one center server 101. In a case where a plurality of the center servers 101 are provided, the plurality of zone servers 102 are allocated to each of the center servers 101. In this case, the number of the zone servers 102 allocated to each of the center servers 101 may be any numbers as long as a plurality of the zone servers 102 are allocated. The respective numbers of the zone servers 102 allocated to the corresponding center servers 101 need not be equalized. In addition, each of the zone servers 102 is only required to belong to any of center servers 101. Accordingly, the single zone server 102 may belong to a plurality of the center servers 101.

Each of the zone servers 102 performs processes relating to user entrance/exit management and fare adjustment, for example.

The information processing system 100 further includes one or more station servers 103. FIG. 1 shows the M (M: any natural number) station servers 103 (station servers 103-1 through 103-M) belonging to the zone server 102-1. In practical situations, however, any number of the station servers 103 are allocated to each of the zone servers 102. In other words, each of the station servers 103 belongs to any of the zone servers 102. The respective numbers of the station servers 103 allocated to the corresponding zone servers 102 need not be equalized. Moreover, the single station server 103 may belong to a plurality of the zone servers 102.

For example, each of the station servers 103 is provided for a corresponding station of passenger railroads. For example, each of the station servers 103 performs a process relating to a communication relay between the zone server 102 and gate controllers 104. A router, a hub or the like may be provided in place of each of the station servers 103. In addition, each of the station servers 103 may perform a part of the processes relating to user entrance/exit management, fare adjustment and the like.

The information processing system 100 further includes a plurality of the gate controllers 104. While the N (N: any natural number) gate controllers 104 (gate controllers 104-1 through 104-N) belonging to the station server 103-1 are shown in FIG. 1, any number of the gate controllers 104 are allocated to each of the station servers 103 in practical situations. In other words, each of the gate controllers 104 belongs to any of the station servers 103. The respective numbers of the gate controllers 104 allocated to the corresponding station servers 103 need not be equalized.

For example, each of the gate controllers 104 is provided for a corresponding automatic ticket gate equipped at a ticket gate of a passenger railroad station. For example, each of the gate controllers 104 performs a process relating to reading of identification data stored in an IC card 121.

The information processing system 100 further includes a plurality of reader/writers 105. While the N reader/writers 105 (reader/writers 105-1 through 105-N) belonging to the N gate controllers 104 (gate controllers 104-1 through 104-N) are shown in FIG. 1, the reader/writers 105 are allocated to all the gate controllers 104 in practical situations. In other words, each of the reader/writer 105 is allocated to any of the gate controllers 104. The respective numbers of the reader/writers 105 allocated to each of the gate controllers 104 may be any numbers, either one or larger numbers. Furthermore, the respective numbers of the reader/writers 105 allocated to the corresponding gate controllers 104 need not be equalized.

For example, each of the reader/writers 105 is provided, together with the corresponding gate controller 104, for a corresponding automatic ticket gate equipped at a ticket gate of a passenger railroad station. For example, each of the reader/writer 105 is controlled by the gate controller 104 to which the reader/writer 105 belongs to communicate with the IC card 121 coming close to the reader/writer 105 via short-distance wireless communication (contactless communication).

Each of the IC cards 121 is a storage device (terminal device) carried by a user of a passenger railroad service (i.e., information processing system 100). While the P (P: any natural number) IC cards 121 (IC cards 121-1 through 121-P) are shown in FIG. 1, the number of the IC cards 121 may be any number.

For example, each of the IC cards 121 is a so-called contactless type IC card which stores data, and provides the data by short-distance wireless communication with the reader/writer 105 coming close to the IC card 121.

Note that discussed hereinbelow is the IC card 121 presented by way of example. However, a storage device (terminal device) carried by the user of the information processing system 100 is not limited to this type of contactless type IC card. For example, the storage device (terminal device) may be a contact-type card which communicates with a reader/writer in a state of contact with the reader/writer, or any information processing device having functions similar to the function of the IC card 121, such as a cellular phone, a smartphone, a tablet-type device, and a personal computer. Accordingly, the storage device (terminal device) may be realized by any devices as long as the devices are capable of storing information similar to information stored in the IC card 121, and transmitting and receiving information to and from the gate controller 104 similarly to the IC card 121.

The information processing system 100 further includes a database 111 belonging to the center server 101. While the single database 111 is shown in FIG. 1, the number of the database 111 may be any number. A plurality of the databases 111 may be allocated to the one center server 101, or the one database 112 may belong to a plurality of the center servers 101. In addition, the respective numbers of the databases 111 allocated to the plurality of corresponding center servers 101 need not be equalized.

The database 111 stores and manages user data processed by the center server 101.

The information processing system 100 further includes databases 112 belonging to the corresponding one of the zone servers 102. While the K databases 112 (databases 112-1 through 112-K) are shown in FIG. 1, the number of the databases 112 may be any number. In addition, while the one database 112 is allocated to each of the zone servers 102 in FIG. 1, the number of the databases 112 allocated to each of the zone server 102 may be any number. A plurality of databases 112 may be allocated to the single zone server 102, or the single database 112 may belong to a plurality of the zone servers 102. In addition, the respective numbers of the databases 112 allocated to the corresponding zone servers 102 need not be equalized.

Each of the databases 112 stores and manages user data processed by the zone server 102 to which the database 112 belongs.

Note that the center servers 101, the zone servers 102, the station servers 103, the gate controllers 104 and others included in the information processing system 100 described above may have any physical configurations as long as logical configurations are adopted.

For example, each of the respective center servers 101, the respective zone servers 102, the respective station servers 103, and the respective gate controllers 104 may be realized by one independent device. Alternatively, for example, the two or more zone servers 102 may be realized by one device, the two or more station servers 103 may be realized by one device, or the two or more gate controllers 104 may be realized by one device. Moreover, in a case where a plurality of the center servers 101 are provided, the two or more center servers 101 may be realized by one device, for example. Furthermore, two or more selected from any of the center servers 101, the zone servers 102, the station servers 103, and the gate controllers 104 may be realized by one device, for example.

Note that the database 111 may be included in the configuration of the center server 101 to which the database 111 belongs. (In other words, the center server 101 and the database 111 may be constituted by one device.) Similarly, each of the databases 112 may be included in the configuration of the zone server 102 to which the database 112 belongs. (In other words, the zone server 102 and the database 112 may be constituted by one device.)

Discussed hereinbelow is such a case where each configuration of respective layers (such as respective center servers 101, respective zone servers 102, respective station servers 103, and respective gate controllers 104) is realized as an independent different device for convenience of description.

In this case, the respective configurations (respective devices) are communicatively connected to each other via any communication medium. At least configurations (devices) connected by two-direction arrows in FIG. 1 are communicatively connected with each other via any communication medium. This communication medium may be constituted by a cable in conformity with predetermined communication standards such as a universal serial bus (USB) cable and a high-definition multimedia interface (HDMI) (registered trademark) cable, or a network such as the Internet, a public telephone line, a local area network (LAN), and a wide area network (WAN). In addition, the communication medium may be constituted by a plurality of networks, or a plurality of types of communication media. Moreover, the communication medium may include any types of communication device such as a router, a hub, and a server. Furthermore, communication performed via the communication medium may be wired communication, wireless communication, or a combination of the two types of communication. Accordingly, the communication medium is not limited to the communication medium for wired communication described above, but may be a communication medium for wireless communication (i.e., space), or a combination of the two types of communication medium. Any communication standards and protocols may be adopted for either types of the communication and communication medium described above.

Note that the expressions "A belongs to B" and "A is allocated to B" in the above description refer to relationships indicated by the two-direction arrows in the layer structure shown in FIG. 1, and indicate a state that a low-order configuration A is linked (associated) with a high-order configuration B. Accordingly, these expressions indicate such a relationship that the configuration A and the configuration B are allowed to transmit and receive information to and from each other, or such a state that the configuration A and the configuration B are allowed to transmit and receive information to and from each other.

For example, the zone servers 102 are connected to the center server 101 to which the zone servers 102 belong (are allocated) via a predetermined communication medium, and communicate with the center server 101 via established connection with the center server 101. Accordingly, the zone servers 102 and the center server 101 have a relationship allowing communication (transmission and reception of information) with each other.

In addition, for example, the gate controllers 104 are connected to the zone server 102 to which the gate controllers 104 belong (are allocated) via a predetermined communication medium, and communicate with the zone server 102 via established connection with the zone server 102. Accordingly, the gate controllers 104 and the zone server 102 are in a state allowing communication (transmission and reception of information) with each other.

Note that the "belonging" relationship may be either a direct relationship or an indirect relationship. For example, the gate controllers 104 indirectly belong to the zone server 102 via the station server 103 to which the gate controllers 104 directly belong in a state that the station server 103 directly belongs to the zone server 102. In this case, it is considered that the gate controllers 104 also belong to the zone server 102. This relationship is applicable to the expression of the "allocated" relationship.

Needless to say, connection between the center server 101 and the zone servers 102 may be also established beforehand.

As described above, at least the center server 101, the zone servers 102, and the gate controllers 104 in the information processing system 100 have a layer configuration (are layered). The processes relating to user entrance/exit management, fare adjustment and the like are performed in each of the zone servers 102 in an intermediate layer.

Accordingly, the information processing system 100 prevents increase in processing loads performed by a large number of the gate controllers 104, and concentration of processing loads on a small number of the center servers 101.

Note that the one or more gate controllers 104 have been allocated to each of the zone servers 102 beforehand. This allocation is made to establish connection between the corresponding zone server 102 and the gate controllers 104 beforehand, as described above. The gate controllers 104 in this state are allowed to immediately communicate with (transmit and receive information to and from) the corresponding zone server 102 More specifically, the gate controllers 104 have already established necessary connection with a communication partner beforehand, and therefore are allowed to omit this process at the time of transmission and reception of information. In other words, reduction of a time required for transmitting and receiving information to and from the zone server 102 (higher-speed transmission and reception of information) is realizable. Accordingly, the gate controllers 104 are capable of executing a larger number of processes other than transmission and reception of information within a predetermined limit time.

The information processing system 100 (zone server 102) performs an entrance process executed when the user passes through a ticket gate and enter therethrough, and an exit process executed when the user passes through a ticket gate and leaves therefrom. Each of the entrance process and the exit process is not an independent process, wherefore information needs to be shared between these processes. For example, information about an entrance history updated in the entrance process is also used in the exit process for detection of a dishonest act or fare adjustment.

However, there are equipped a plurality of automatic ticket gates (gate controllers 104) as described above, in which condition the automatic ticket gate used by the user at the time of entrance is not necessarily identical to the automatic ticket gate used at the time of exit. In case of typical passenger railroads, a station into which the user enters is often different from a station from which the user leaves. In this case, it is considered that the entrance process and the exit process are respectively executed by the different zone servers 102.

Accordingly, information used for the entrance process and the exit process may be transmitted and received between the zone servers 102, for example. Note that information updated in the entrance process and the exit process may be managed for each user as user data. More specifically, each of the zone servers 102 may be configured to share user data (transmit and receive user data).

Any sharing methods may be adopted for sharing user data described herein. For example, user data updated in the entrance process or exit process may be retained in the zone server 102 having executed the entrance process or exit process, or may be retained in a dedicated server prepared for retaining the updated user data. However, when search and acquisition of user data updated in the entrance process or exit process performed one process before are needed from the outside of the zone server 102 at the time of the entrance process or exit process by the zone server 102, for example, it may become difficult to finish the process within a predetermined limit time due to elongation of a processing time.

Accordingly, user data updated in the entrance process or exit process may be supplied beforehand to the zone server 102 performing the next entrance process or exit process prior to execution of the next entrance process or exit process Any methods may be adopted to supply updated user data. For example, the zone server 102 having performed the entrance process or exit process may distribute user data updated in the process to all the zone server 102. In this case, however, communication traffics increase with distribution of updated user data, causing a delay or breakage of communication in some cases.

For overcoming this problem, updated user data may be supplied to the zone server 102 predicted as the zone server 102 performing the next entrance process or exit process before execution of the next process. Any methods may be adopted for this prediction. For example, the zone server 102 performing the next process may be predicted on the basis of predetermined prediction data corresponding to the user having entered or left (identification data contained in IC card 121 carried by corresponding user). This prediction may be performed by any configurations (devices). For example, the zone server 102 having executed the entrance process or exit process may perform this prediction.

Alternatively, configurations (devices) other than the zone server 102 having executed the entrance process or exit process may perform this prediction. For example, the center server 101 or the different zone server 102 may perform this prediction. Furthermore, a configuration (device) dedicated for prediction may be provided, for example. In the foregoing cases, however, information necessary for prediction needs to be transmitted or received, and therefore may increase communication traffics.

In any of the above methods to be adopted, the zone server 102 performing the next process acquires user data corresponding to the user (identification data) and supplied on the basis of prediction data corresponding to the user (identification data) prior to execution of the process, and performs the entrance process or exit process corresponding to the user (identification data) (i.e., processes (updates) user data).

In this case, the updated user data is shared between the zone servers 102 along with reduction of increase in communication traffics and processing time. In other words, execution of the processes relating to user entrance/exit management, fare adjustment and the like by a plurality of the zone servers 102 is realizable.

Accordingly, the information processing system 100 (zone server 102) realizes a system capable of increasing efficiency while reducing concentration of loads.

<Zone>

Zones are hereinafter described. Each of the zone servers 102 may be provided for the corresponding one of the zones different from each other. The zones referred to herein are physical areas for which the gate controllers 104 are provided. More specifically, a plurality of the gate controllers 104 (such as respective automatic ticket gates) are disposed at physical positions different from each other, for example, and are allocated to the corresponding zone servers 102 different for each predetermined zone for which the corresponding gate controllers 104 are provided. In other words, the gate controllers 104 provided for the zone associated with the corresponding zone server 102 (zone different for each zone server 102) may be allocated to each of the zone servers 102.

Figure 2:
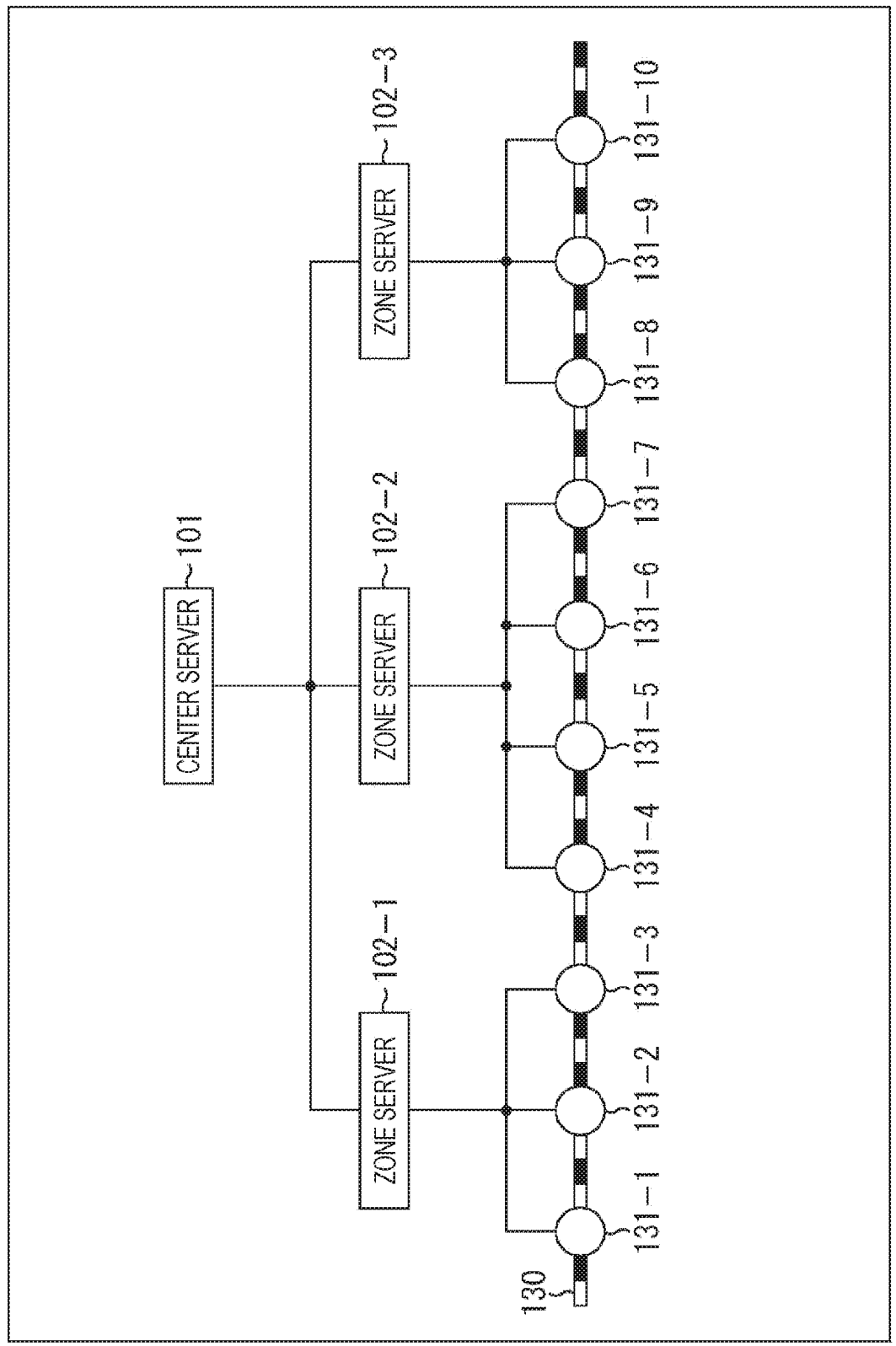
FIG. 2 is a diagram showing a configuration example of a layer of the information processing system.

According to an example illustrated in FIG. 2, the gate controllers 104 (not shown) provided for stations 131-1 through 131-3 of a line 130 are allocated to the zone server 102-1. Moreover, the gate controllers 104 (not shown) provided for stations 131-4 through 131-7 of the line 130 are allocated to the zone server 102-2. Furthermore, the gate controllers 104 (not shown) provided for stations 131-8 through 131-10 of the line 130 are allocated to the zone server 102-3. In the following description, the stations 131-1 through 131-10 are collectively referred to as the stations 131 in a case where no distinction between the stations 131-1 through 131-10 is needed.

When the stations 131 different from each other (such as station servers 103) are allocated to the corresponding zone servers 102, the gate controllers 104 provided for the corresponding stations 131 different from each other (i.e., zones different from each other) are allocated to the corresponding zone servers 102.

In general, a shift of a user is often limited to a certain range in transportation facilities such as passenger railroads. In other words, the frequency of a long-distance shift tends to decrease in comparison with the frequency of short-distance shift. In this case, allocation of the gate controllers 104 to each zone as in the example shown in FIG. 2 increases the possibility that the entrance process and exit process are executed by the identical zone server 102. Accordingly, this allocation reduces increase in communication traffics for transmission and reception of user data between the zone servers 102.

Needless to say, any methods may be adopted to allocate the gate controllers 104 to the zone servers 102, such as allocation not for each zone. For example, the gate controllers 104 may be allocated in accordance with special tendencies of a shift of a user, such as high shift frequency between predetermined stations, in a case where such tendencies are present. Alternatively, allocation of the gate controllers 104 may be determined such that loads on the respective zone servers 102 become uniform on the basis of the foregoing tendencies or the like of the user, for example.

<Configuration of Center Server and Others>

Figure 3:
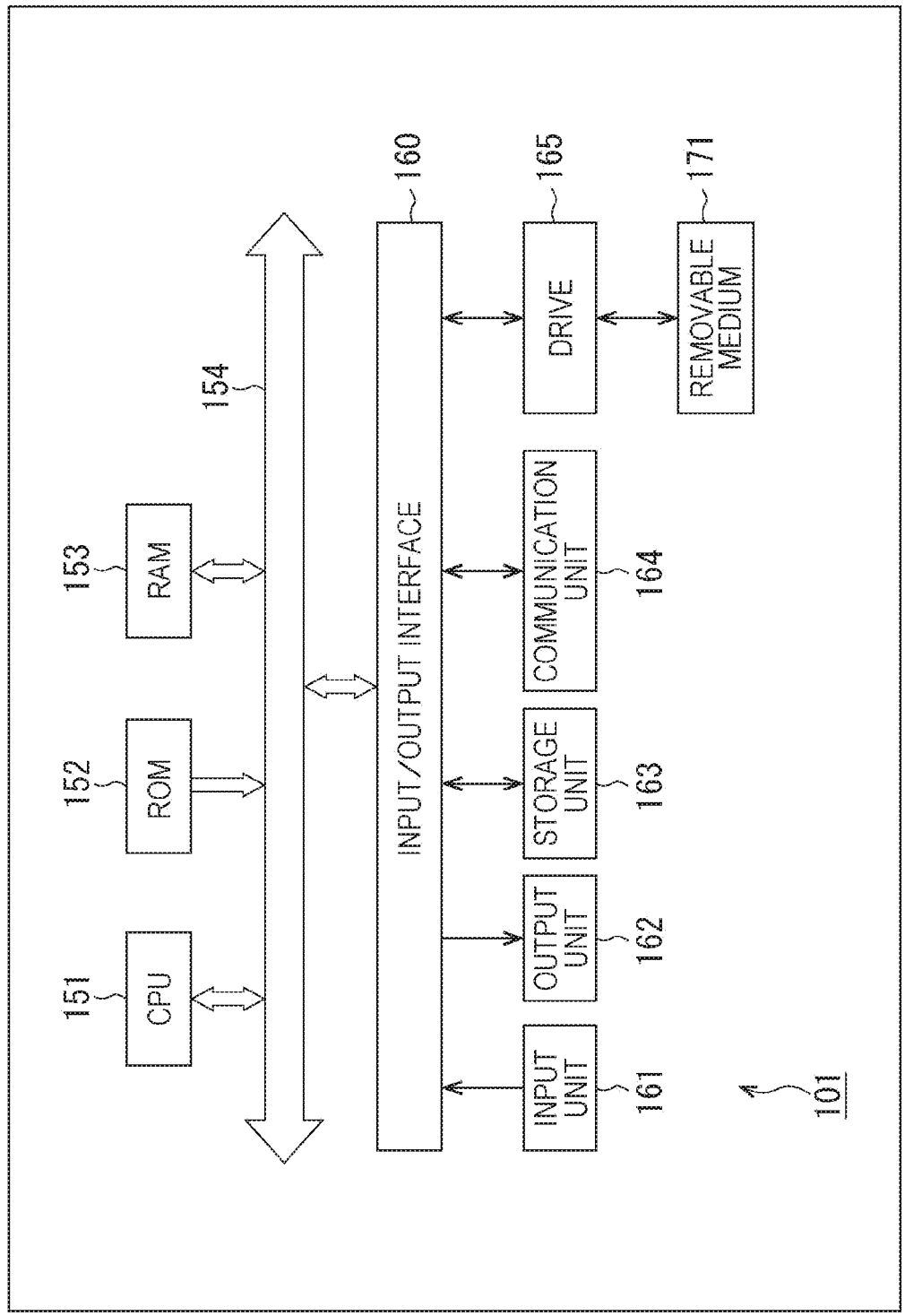
FIG. 3 is a block diagram showing a main configuration of a center server.

FIG. 3 is a block diagram showing a main configuration of the center server 101. As shown in FIG. 3, a central processing unit (CPU) 151, a read only memory (ROM) 152, and a random access memory (RAM) 153 of the center server 101 are connected to each other via a bus 154.

An input/output interface 160 is further connected to the bus 154. An input unit 161, an output unit 162, a storage unit 163, a communication unit 164, and a drive 165 are connected to the input/output interface 160.

The input unit 161 is constituted by an input device which receives information from the outside, such as user input. For example, the input unit 161 includes a keyboard, a mouse, an operation button, a touch panel, a camera, a microphone, an input terminal and others. The input unit 161 may further include an acceleration sensor, a light sensor, a temperature sensor and other various types of sensors, or a barcode reader and other input devices.

The output unit 162 is constituted by an output device which outputs information such as images and voices. For example, the output unit 162 includes a display, a speaker, an output terminal and others.

For example, the storage unit 163 is constituted by a hard disk, a RAM disk, a non-volatile memory, and others. For example, the communication unit 164 is constituted by a network interface. For example, the communication unit 164 communicates with other devices connected to the communication unit 164 via a predetermined communication medium. The drive 165 drives a removable medium 171 attached to a predetermined position of the drive 165, such as a magnetic disk, an optical disk, a magneto-optical disk, and a semiconductor memory, to read information stored in the removable medium 171 or write information to the removable medium 171.

For example, the CPU 151 loads programs stored in the storage unit 163 to the RAM 153 via the input/output interface 160 and the bus 154, and executes the loaded programs to perform various types of processes. The RAM 153 further stores data necessary for execution of various types of processes by the CPU 151, for example.

Note that each of the zone servers 102, the station servers 103, the gate controllers 104, the reader/writers 105, the database 111, and the databases 112 may include the configuration shown in FIG. 3. In other words, the description described above with reference to FIG. 3 is applicable to the description of each of these devices.

Needless to say, each of these devices may have configurations other than the configuration example shown in FIG. 3.

Note that each of the reader/writers 105 and the corresponding gate controller 104 may be constituted by one device. In this case, the reader/writer 105 may constitute a part of the configuration of the communication unit 164 of the gate controller 104. Moreover, the database 111 and the center server 101 may be constituted by one device. In this case, the database 111 is included in the storage unit 163 of the center server 101. Furthermore, each of the databases 112 and the corresponding zone server 102 may be constituted by one device. In this case, the database 112 is included in the storage unit 163 of the zone server 102.

<Configuration of IC Card>

Figure 4:
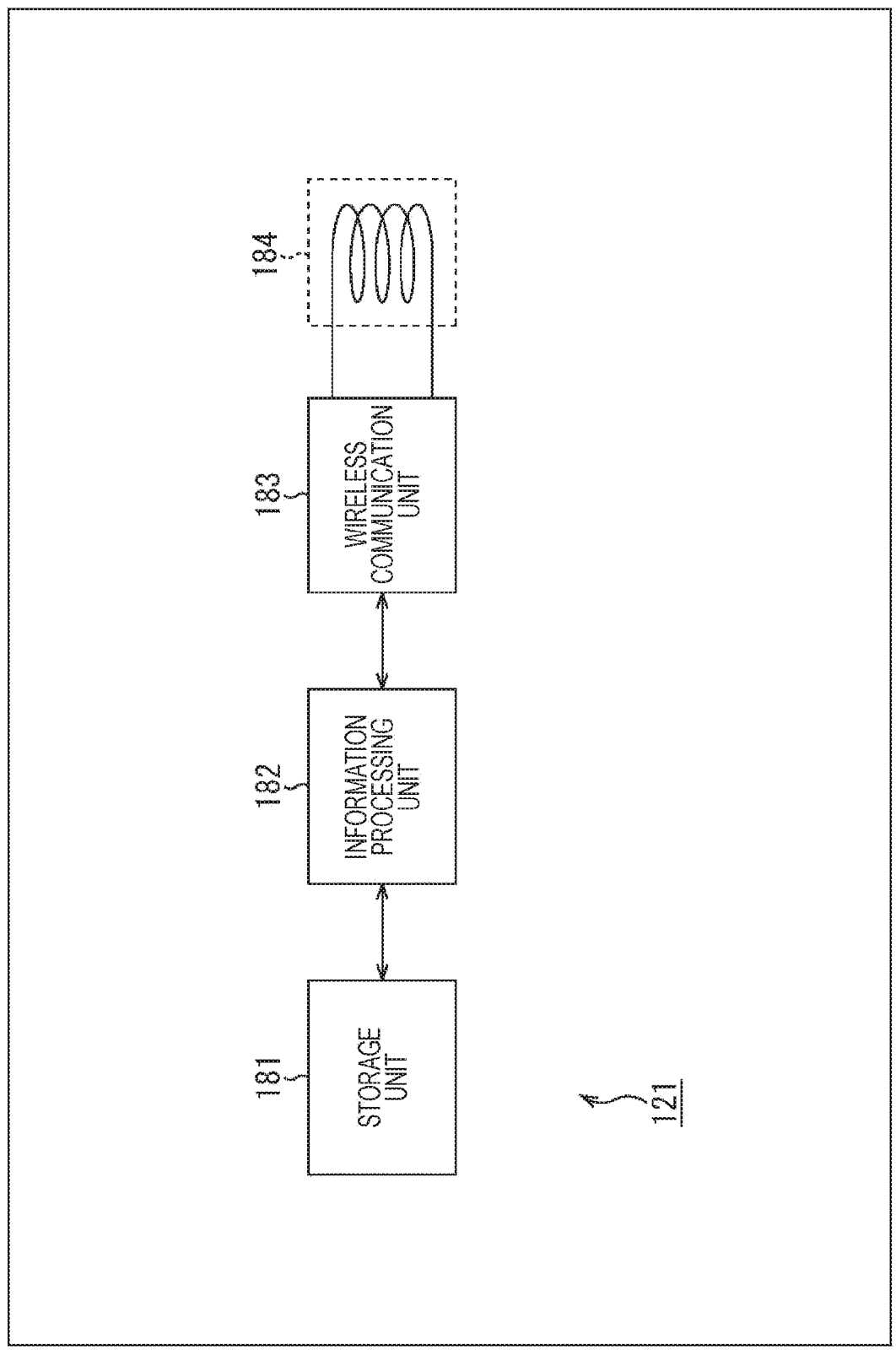
FIG. 4 is a block diagram showing a main configuration example of an IC card.

FIG. 4 is a block diagram showing a main configuration example of the IC card 121. As shown in FIG. 4, the IC card 121 includes a storage unit 181, an information processing unit 182, a wireless communication unit 183, and an antenna 184.

The storage unit 181 stores any information. For example, the storage unit 181 stores information used by external devices. For example, the storage unit 181 stores identification data used for identification of the IC card 121. The storage unit 181 supplies stored information to the information processing unit 182 as necessary. Note that the storage unit 181 may store information supplied from the information processing unit 182.

The information processing unit 182 executes programs, and processes various types of information. The information processing unit 182 further reads information stored in the storage unit 181. The information processing unit 182 further allows the wireless communication unit 183 to communicate with other devices (such as reader/writer 105) to receive information transmitted from these devices, or transmit information to these devices. Note that the information processing unit 182 may supply information to the storage unit 181 to store the information in the storage unit 181.

The wireless communication unit 183 communicates with other devices (such as reader/writer 105) by short-distance wireless communication via the antenna 184 in conformity with predetermined communication standards. The wireless communication unit 183 acquires information from other devices via the short-distance wireless communication, and supplies the acquired information to the information processing unit 182. In addition, the wireless communication unit 183 receives information from the information processing unit 182, and transmits the received information to other devices via the short-distance wireless communication.

Needless to say, the IC card 121 may have a configuration other than the configuration example shown in FIG. 4.

<Function Blocks of Respective Configurations>

Figure 5:
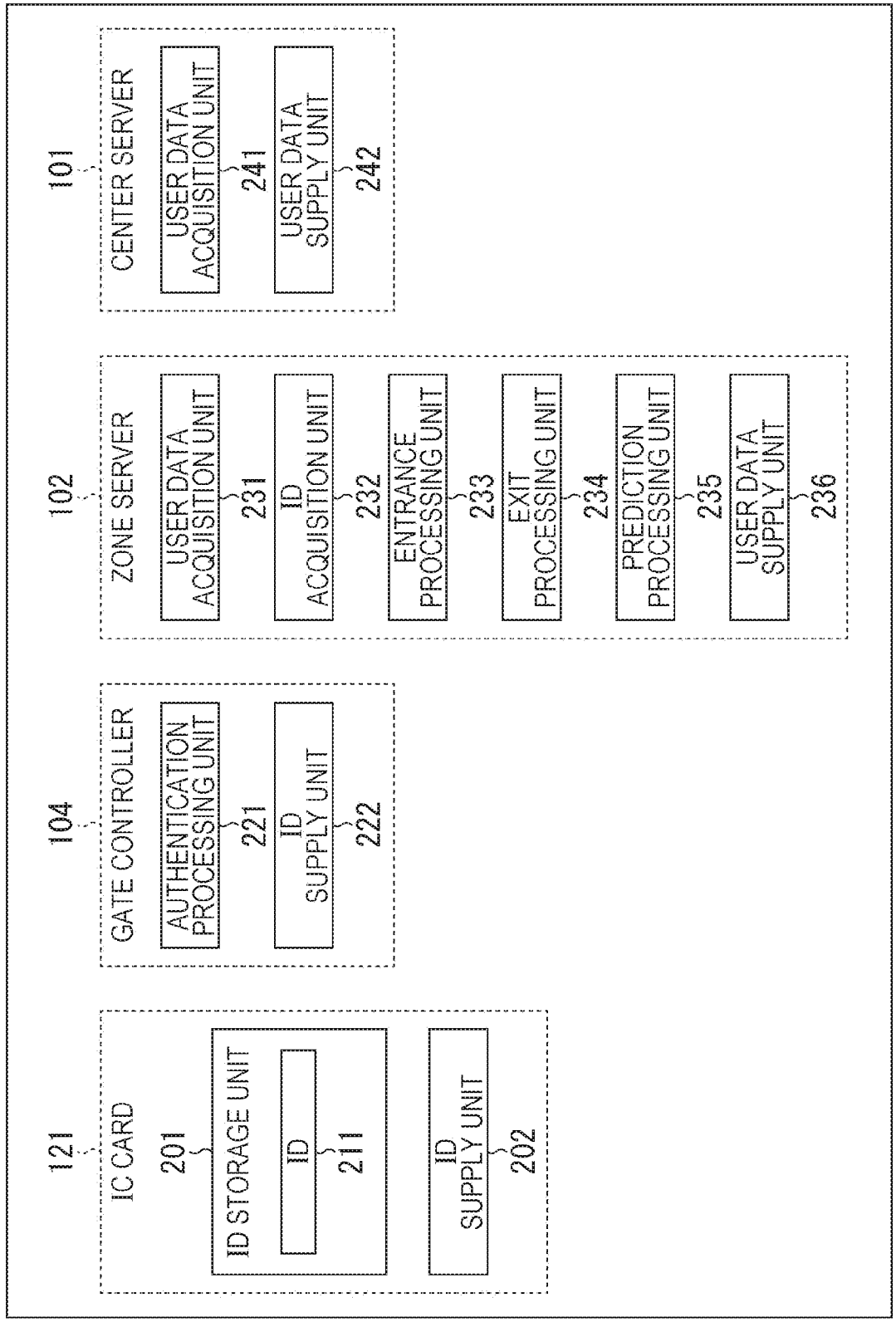
FIG. 5 is a function block diagram showing an example of main functions included in respective devices.

FIG. 5 is a diagram showing a configuration example of function blocks indicating functions realized by the IC card 121, the gate controller 104, the zone server 102, and the center server 101. These configurations may be realized by execution of programs or processing of data, for example.

As shown in FIG. 5, the IC card 121 realizes function blocks such as an ID storage unit 201 and an ID supply unit 202. The ID storage unit 201 stores identification data (ID) 211. The ID storage unit 201 is realized by the storage unit 181 under control by the information processing unit 182. The ID supply unit 202 performs a process relating to supply of the identification data (ID) 211 stored in the ID storage unit 201. The ID supply unit 202 is realized under control over the storage unit 181 and the wireless communication unit 183 by the information processing unit 182, or in other manners. For example, the ID supply unit 202 reads the identification data (ID) 211 from the ID storage unit 201 (storage unit 181), and supplies the read identification data (ID) 211 to the gate controller 104 via the wireless communication unit 183 (via reader/writer 105).

The gate controller 104 realizes function blocks such as an authentication processing unit 221 and an ID supply unit 222. The authentication processing unit 221 performs a process relating to authentication of the identification data (ID) 211 contained in the IC card 121. For example, the authentication processing unit 221 is executed by processing and control over the communication unit 164 by the CPU 151. For example, the authentication processing unit 221 acquires the identification data (ID) 211 supplied from the IC card 121 via the communication unit 164 (via reader/writer 105). For example, the authentication processing unit 221 further authenticates the acquired identification data (ID) 211. Any methods may be adopted to authenticate the identification data (ID) 211. For example, the authentication processing unit 221 further notifies the IC card 121 about authentication of the identification data (ID) 211 via the communication unit 164 (via reader/writer 105) when the identification data (ID) 211 is authenticated.

The ID supply unit 222 performs a process relating to supply of the identification data (ID) 211 to the zone server 102. For example, the ID supply unit 222 is executed by processing and control over the communication unit 164 by the CPU 151. For example, the ID supply unit 222 supplies the identification data (ID) 211 acquired by the authentication processing unit 221 to the zone server 102 via the communication unit 164 (via station server 103).

The zone server 102 realizes function blocks such as a user data acquisition unit 231, an ID acquisition unit 232, an entrance processing unit 233, an exit processing unit 234, a prediction processing unit 235, a user data supply unit 236 and others. The user data acquisition unit 231 performs a process relating to acquisition of user data. For example, the user data acquisition unit 231 is executed by processing and control over the database 112 (or storage unit 163) and the communication unit 164 by the CPU 151. For example, the user data acquisition unit 231 acquires, via the communication unit 164, user data corresponding to the identification data (ID) 211 and supplied from the different zone server 102 or the center server 101 on the basis of prediction data corresponding to the identification data (ID) 211. For example, the user data acquisition unit 231 further stores the acquired user data in the database 112 (or storage unit 163). For example, the user data acquisition unit 231 further acquires user data from the center server 101 via the communication unit 164 in a case where user data (i.e., user data corresponding to identification data (ID) 211 acquired by the ID acquisition unit 232) used for an entrance process or exit process is not stored in the database 112 (or storage unit 163) at the time of execution of the entrance process or exit process.

The ID acquisition unit 232 performs a process relating to acquisition of the identification data (ID) 211 contained in the IC card 121 supplied from the gate controller 104. For example, the ID acquisition unit 232 is executed by processing and control over the communication unit 164 by the CPU 151. For example, the ID acquisition unit 232 acquires, via the communication unit 164 (via station server 103), the identification data (ID) 211 supplied from the gate controller 104.

The entrance processing unit 233 performs an entrance process when the user passes through a ticket gate and enters therethrough. The entrance process include management (confirmation and update of information indicating whether user is currently entering or leaving), update of information indicating behavior histories of the user, and others. The entrance process may further include a fare adjustment process for adjusting base fare and the like on the basis of electronic money amount information registered in user data. For example, the entrance processing unit 233 is executed by processing and control over the database 112 (or storage unit 163) by the CPU 151. For example, the entrance processing unit 233 executes the entrance process for the identification data (ID) 211 acquired by the ID acquisition unit 232, reads user data from the database 112 (or storage unit 163) as data corresponding to the identification data (ID) 211 and acquired by the user data acquisition unit 231, and updates the read user data. The updated user data may be stored in the database 112 (or storage unit 163).

The exit processing unit 234 performs an exit process when the user passes through a ticket gate and leaves therefrom. For example, the exit process includes management of exit (confirmation and update of information indicating whether user is currently entering or leaving), update of information indicating behavior histories of the user, data relating to a commutation ticket, fare adjustment processing in accordance with a traveled section, and others. For example, the exit processing unit 234 is executed by processing and control over the database 112 (or storage unit 163) by the CPU 151. For example, the exit processing unit 234 executes an exit process for the identification data (ID) 211 acquired by the ID acquisition unit 232, reads user data from the database 112 (or storage unit 163) as data corresponding to the identification data (ID) 211 and acquired by the user data acquisition unit 231, and updates the read user data. The updated user data may be stored in the database 112 (or storage unit 163).

The prediction processing unit 235 performs a process relating to prediction of the zone server 102 to which user data is to be supplied (i.e., zone server 102 which subsequently processes corresponding user data). For example, the prediction processing unit 235 is executed by processing and control over the database 112 (or storage unit 163) by the CPU 151. For example, the prediction processing unit 235 predicts the zone server 102 to which the gate controller 104 belongs, as the gate controller 104 subsequently reading the identification data (ID) 211 from the IC card 121, on the basis of prediction data or the like contained in the user data.

The user data supply unit 236 performs a process relating to supply of user data updated by the entrance process or exit process. For example, the user data supply unit 236 is executed by processing and control over the database 112 (or storage unit 163) and the communication unit 164 by the CPU 151. For example, the user data supply unit 236 supplies, via the communication unit 164, user data updated by the entrance process or exit process to the zone server 102 or the like predicted by the prediction process. For example, the user data supply unit 236 further supplies, via the communication unit 164, user data updated by the entrance process or exit process to the center server 101.

The center server 101 realizes function blocks such as a user data acquisition unit 241 and a user data supply unit 242. The user data acquisition unit 241 performs a process relating to acquisition of user data. For example, the user data acquisition unit 241 is executed by processing and control over the database 111 (or storage unit 163) and the communication unit 164 by the CPU 151. For example, the user data acquisition unit 241 acquires, via the communication unit 164, user data supplied from the zone server 102. For example, the user data acquisition unit 241 further stores the acquired user data in the database 111 (or storage unit 163).

The user data supply unit 242 performs a process relating to supply of user data. The user data supply unit 242 is executed by processing and control over the database 111 (or storage unit 163) and communication unit 164 by the CPU 151. For example, the user data supply unit 242 reads user data stored in the database 111 (or storage unit 163), and supplies the read user data to the zone server 102 and others via the communication unit 164.

Note that the function blocks shown in FIG. 5 are presented only by way of example of functions realized by the respective devices. The respective devices may realize functions other than those of the example shown in FIG. 5. In addition, the respective devices may realize only a part of the functions of the example shown in FIG. 5.

<Database and User Data>

Figure 6:
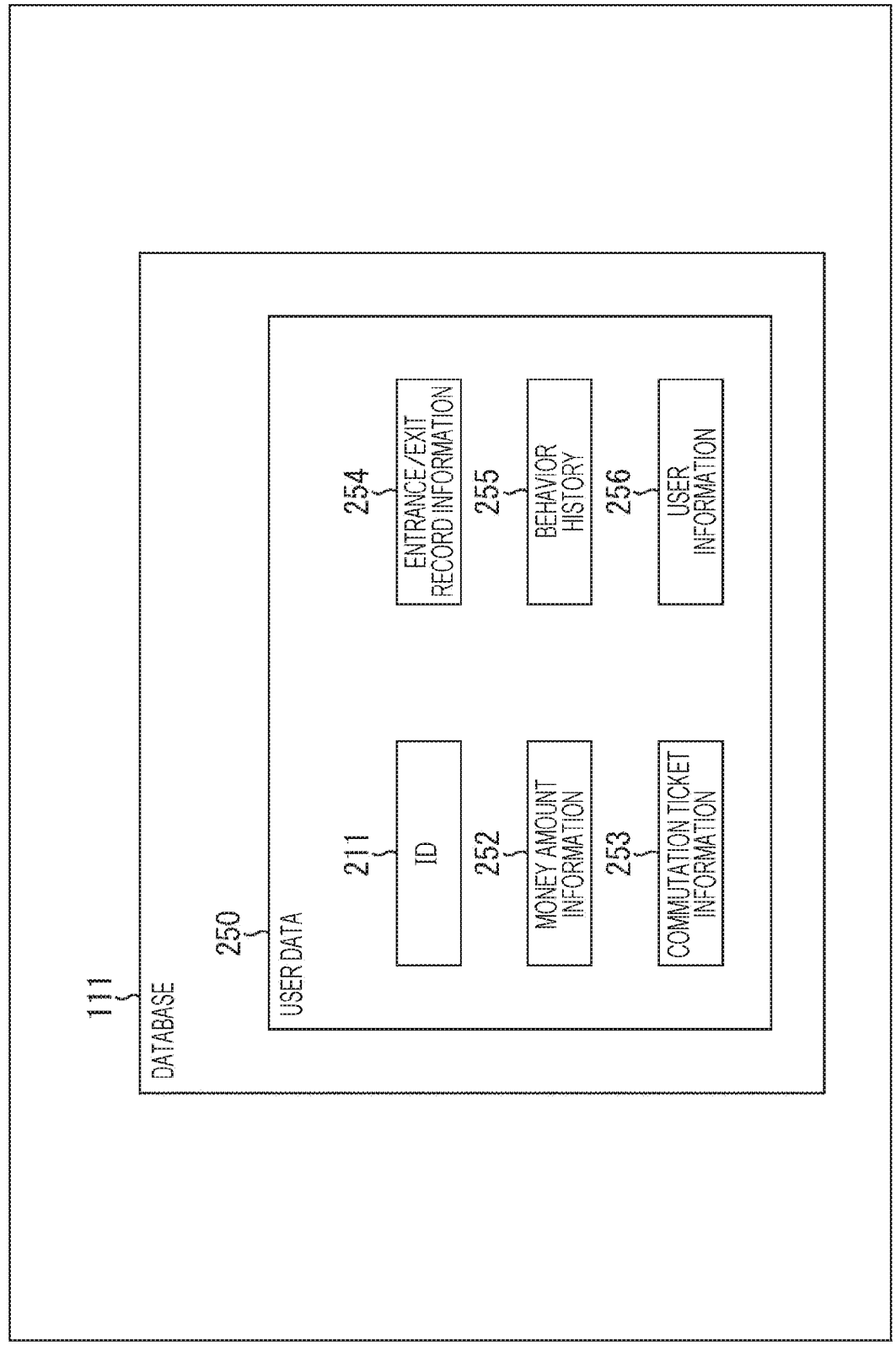
FIG. 6 is a diagram showing a main configuration example of user data.

As shown in FIG. 6, the database 111 stores user data 250 indicating information about the user, and managed for each of identification data (ID) 211.

As shown in FIG. 6, the user data 250 includes the identification data (ID) 211, money amount information 252, commutation ticket information 253, entrance/exit record information 254, a behavior history 255, and user information 256. More specifically, various types of information such as the money amount information 252, the commutation ticket information 253, the entrance/exit record information 254, the behavior history 255, and the user information 256 are managed in the user data 250 in correspondence with (in association with) the identification data (ID) 211.

The money amount information 252 is data relating to a registered amount of electronic money. An amount of electronic money indicated in the money amount information 252 may be spent for fare adjustment, for example. The commutation ticket information 253 is data relating to a commutation ticket purchased by the user. A section and a term of validity are generally set for the commutation ticket information 253. The user is allowed to freely board in the specified section and for the specified term of validity. The entrance/exit record information 254 is data indicating a state that the user has entered or left. This information is updated for every entrance process or exit process. A dishonest act such as successive execution of the exit process is detectable on the basis of this information. The behavior history 255 is data relating to a history of shifts (behaviors) of the user. For example, this information includes a history of entrance stations and ticket gates, exit stations and ticket stations, and others (history of boarding section and date and time). The user information 256 is data relating to the user corresponding to an owner of the IC card 121 associated with the identification data (ID) 211. For example, this information includes personal information about the user, such as the name, address, age, gender, and occupational category of the user.

Information such as the money amount information 252, the commutation ticket information 253, the behavior history 255, and the user information 256 is utilized for fare adjustment. For example, the behavior history 255 (including start point of boarding), the user information 256 (including whether the user is an adult or a child, or has privileges), and the commutation ticket information 253 (including whether boarding section contains section of commutation ticket) are referred to for calculation of a fare to be collected. In addition, the money amount information 252 is referred to for collection of the calculated fare (money amount of money amount information 252 is updated after collection of fare), for example.

Furthermore, information such as the commutation ticket information 253 and the behavior history 255 is utilized for prediction of the zone server 102 to which the user data 250 is supplied. Accordingly, these items of information are referred to as prediction data.

Needless to say, information other than the examples described above may be included in the respective items of information contained in the user data 250. Moreover, the user data 250 may include data other than the data described above. Furthermore, an unnecessary part of the foregoing data may be omitted in accordance with the purpose of use of the information processing system 100.

The database 112 also stores the user data 250 similarly to the example shown in FIG. 6. Contents of the user data 250 stored in the database 112 are similar to the contents of the user data 250 in the example shown in FIG. 6. The contents of the user data 250 stored in the database 111 and the contents of the user data 250 stored in the database 112 may be either identical or not. However, considering the point that the user data 250 stored in the database 111 is used as backup for the user data 250 stored in the database 112, or for investigation of the user data 250 stored in the database 112, it is preferable that at least the user data 250 stored in the database 111 contains all the contents of the user data 250 stored in the database 112.

<Flow of Process Relating to Entrance>

Figure 7:
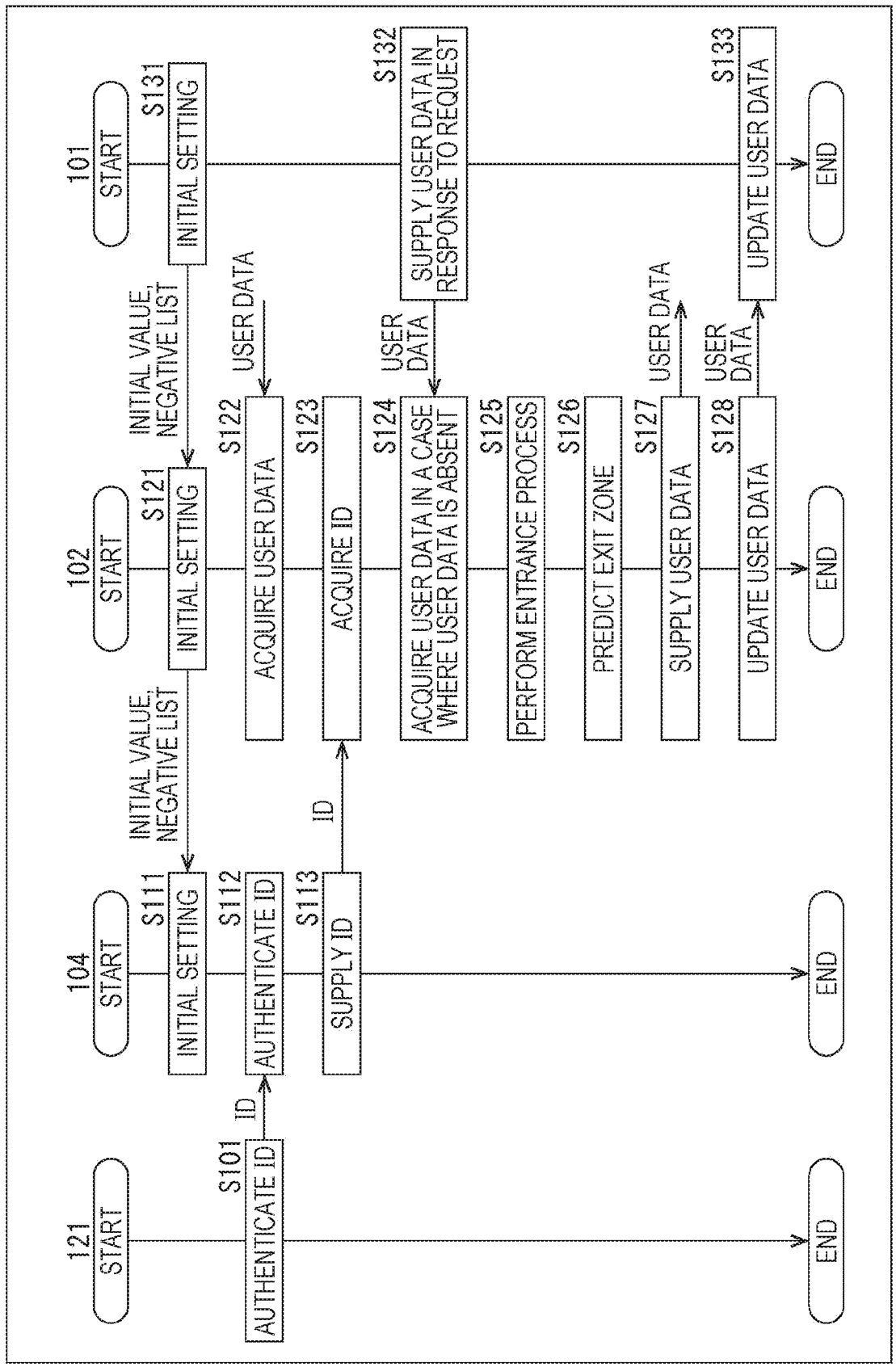
FIG. 7 is a flowchart showing a flow example of a process relating to entrance of a user.

An example flow of the process relating to entrance of the user and executed by the information processing system described above is hereinafter described with reference to a flowchart shown in FIG. 7.

Initially, the gate controller 104, the zone server 102, and the center server 101 initialize settings at a start or other occasions (step S111, step S121, step S131), whereafter the center server 101 supplies initial values and a negative list (list of identification data (ID) 211 associated with dishonest processing) to the zone server 102. In this case, checking with the negative list (detection of identification data (ID) 211 contained in negative list) is executed at the zone server 102. Note that the negative list may be also supplied to the gate controller 104. In this case, checking with the negative list may be executed by the gate controller 104.

In addition, the user data acquisition unit 231 of the zone server 102 acquires the user data 250 before execution of the entrance process (before step S124) (step S122). The user data 250 is supplied on the basis of prediction data corresponding to the identification data (ID) 211. The user data 250 is supplied from the different zone server 102 or center server 101, for example. The acquired user data 250 is stored in the database 112 (or storage unit 163 of zone server 102).

When passing through a ticket gate and entering therethrough, the user brings the IC card 121 owned by the user close to the reader/writer 105 of an automatic ticket gate. In this case, the ID supply unit 202 of the IC card 121 performs an ID authentication process, and supplies the identification data (ID) 211 stored in the ID storage unit 201 to the gate controller 104 (step S101).

The authentication processing unit 221 of the gate controller 104 having acquired the identification data (ID) 211 performs an authentication process for the acquired identification data (ID) 211 (step S112). Then, when the identification data (ID) 211 is authenticated, the ID supply unit 222 of the gate controller 104 supplies the identification data (ID) 211 to the zone server 102 (step S113).

The ID acquisition unit 232 of the zone server 102 acquires the identification data (ID) 211 (step S123). The user data acquisition unit 231 checks whether the user data 250 corresponding to the acquired identification data (ID) 211 has been stored in the database 112 (or storage unit 163 of zone server 102). Then, in a case where the user data 250 is absent in the database 112 (or storage unit 163 of zone server 102), i.e., in a case where prediction of the zone server 102 is wrong, the user data acquisition unit 231 acquires the user data 250 corresponding to the acquired identification data (ID) 211 from the center server 101 (step S124).

The user data supply unit 242 of the center server 101 supplies the requested user data 250 to the zone server 102 in response to a request from the user data acquisition unit 231 of the zone server 102 (step S132).

When the current user data 250 is prepared in the foregoing manner, the entrance processing unit 233 of the zone server 102 performs the entrance process, and updates the current user data 250 corresponding to the processing target as necessary (step S125).

When the entrance process is completed, the prediction processing unit 235 predicts a spot from which the user of the IC card 121 corresponding to the identification data (ID) 211 subsequently leaves (exit zone) (step S126). More specifically, the prediction processing unit 235 predicts the zone server 102 to which the gate controller 104 belongs, as the gate controller 104 subsequently reading the identification data (ID) 211 from the IC card 121, on the basis of the prediction data contained in the user data 250 updated by the entrance process (such as commutation ticket information 253 and behavior history 255).

After completion of the prediction, the user data supply unit 236 supplies the user data 250 updated by the entrance process to the zone server 102 predicted as the one to which the gate controller 104 belongs, as the gate controller 104 subsequently reading the identification data (ID) 211 from the IC card 121 (step S127).

In addition, the user data supply unit 236 also supplies the user data 250 updated by the entrance process to the center server 101 to update the user data 250 stored in the database 111 and the like and managed by the center server 101 (step S128).

The user data acquisition unit 241 of the center server 101 acquires the user data 250, and updates the user data 250 managed (stored) in the database 111 and the like (reflect update of user data 250) on the basis of the acquired user data 250 (step S133).

The information processing system 100 performs the process relating to entrance in the manner described above.

<Flow of Process Relating to Exit>

Figure 8:
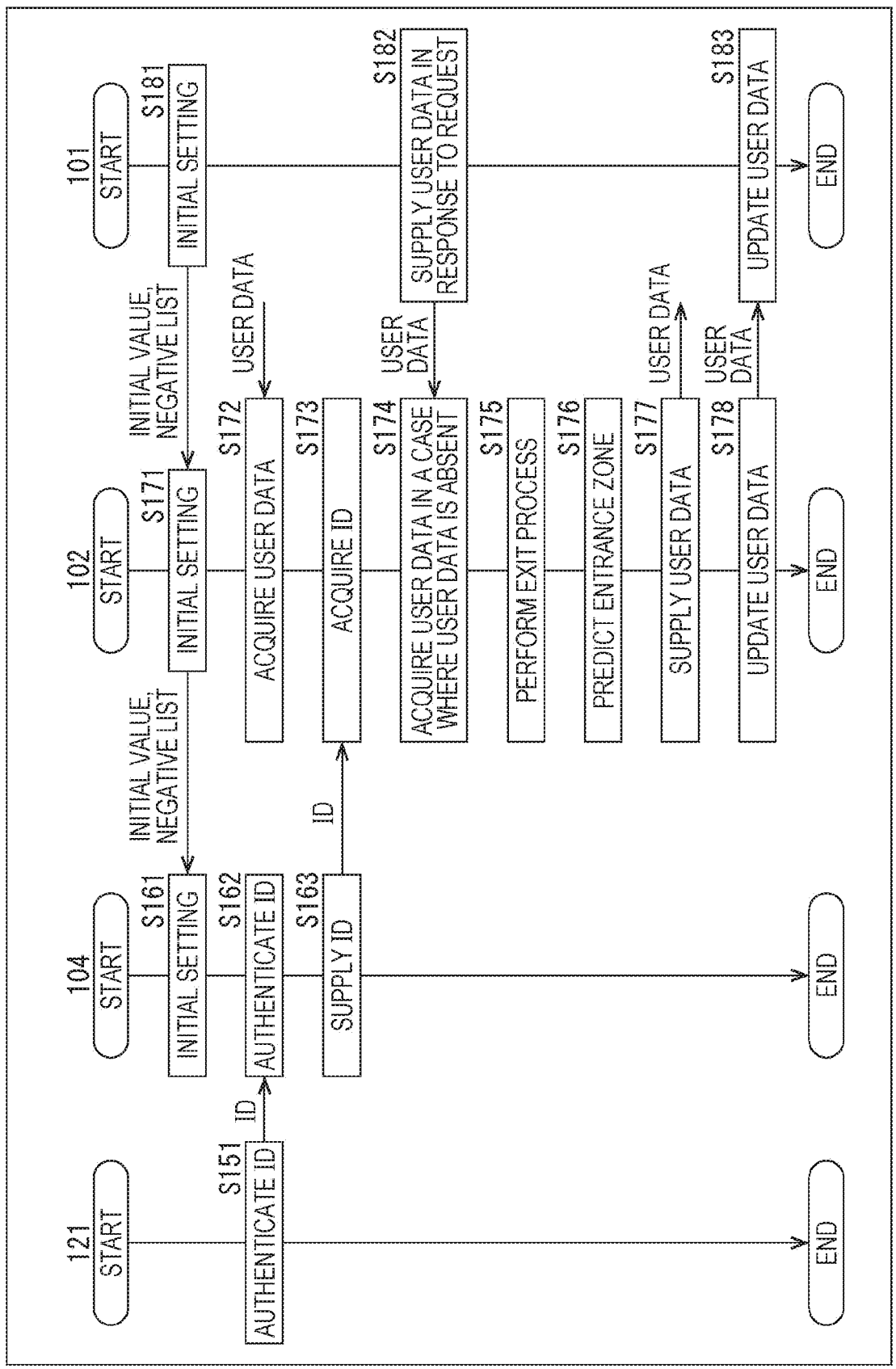
FIG. 8 is a flowchart showing a flow example of a process relating to exit of a user.

An example flow of the process relating to exit of the user and executed by the information processing system described above is hereinafter described with reference to a flowchart shown in FIG. 8.

Initially, the gate controller 104, the zone server 102, and the center server 101 initialize settings at a start or other occasions (step S161, step S171, step S181), whereafter the center server 101 supplies initial values and a negative list (list of identification data (ID) 211 associated with dishonest processing) to the zone server 102. In this case, checking with the negative list (detection of identification data (ID) 211 contained in negative list) is executed at the zone server 102. Note that the negative list may be also supplied to the gate controller 104. In this case, checking with the negative list may be executed by the gate controller 104.

In addition, the user data acquisition unit 231 of the zone server 102 acquires the user data 250 before execution of the exit process (before step S174) (step S172). The user data 250 is supplied on the basis of prediction data corresponding to the identification data (ID) 211. The user data 250 is supplied from the different zone server 102 or center server 101, for example. The acquired user data 250 is stored in the database 112 (or storage unit 163 of zone server 102).

When passing through a ticket gate and leaving therefrom, the user brings the IC card 121 owned by the user close to the reader/writer 105 of an automatic ticket gate. In this case, the ID supply unit 202 of the IC card 121 performs an ID authentication process, and supplies the identification data (ID) 211 stored in the ID storage unit 201 to the gate controller 104 (step S151).

The authentication processing unit 221 of the gate controller 104 having acquired the identification data (ID) 211 performs an authentication process for the acquired identification data (ID) 211 (step S162). Then, when the identification data (ID) 211 is authenticated, the ID supply unit 222 of the gate controller 104 supplies the identification data (ID) 211 to the zone server 102 (step S163).

The ID acquisition unit 232 of the zone server 102 acquires the identification data (ID) 211 (step S173). The user data acquisition unit 231 checks whether the user data 250 corresponding to the acquired identification data (ID) 211 has been stored in the database 112 (or storage unit 163 of zone server 102). Then, in a case where the user data 250 is absent in the database 112 (or storage unit 163 of zone server 102), i.e., in a case where prediction of the zone server 102 is wrong, the user data acquisition unit 231 acquires the user data 250 corresponding to the acquired identification data (ID) 211 from the center server 101 (step S174).

The user data supply unit 242 of the center server 101 supplies the requested user data 250 to the zone server 102 in response to a request from the user data acquisition unit 231 of the zone server 102 (step S182).

When the current user data 250 is prepared in the foregoing manner, the exit processing unit 234 of the zone server 102 performs the exit process, and updates the current user data 250 corresponding to the processing target as necessary (step S175).

When the exit process is completed, the prediction processing unit 235 predicts a spot the user of the IC card 121 corresponding to the identification data (ID) 211 subsequently enters (entrance zone) (step S176). More specifically, the prediction processing unit 235 predicts the zone server 102 to which the gate controller 104 belongs, as the gate controller 104 subsequently reading the identification data (ID) 211 from the IC card 121, on the basis of prediction data contained in the user data 250 updated by the exit process (such as commutation ticket information 253 and behavior history 255).

After completion of the prediction, the user data supply unit 236 supplies the user data 250 updated by the exit process to the zone server 102 predicted as the one to which the gate controller 104 belongs, as the gate controller 104 subsequently reading the identification data (ID) 211 from the IC card 121 (step S177).

In addition, the user data supply unit 236 supplies the user data 250 updated by the exit process to the center server 101 to update the user data 250 stored in the database 111 and the like and managed by the center server 101 (step S178).

The user data acquisition unit 241 of the center server 101 acquires the user data 250, and updates the user data 250 managed (stored) in the database 111 and the like (reflect update of user data 250) on the basis of the acquired user data 250 (step S183).

The information processing system 100 performs the process relating to exit in the manner described above.

<Comparison between Processes for Entrance and Exit>

FIGS. 9A, 9B and 9C are diagrams showing a comparison of entrance and exit processes between a conventional fare adjustment system and the information processing system 100 to which the present technology has been applied.

According to the conventional system, a gate controller performs all of authentication of identification data (ID) (reading of identification data (ID)), reading of money amount information, a commutation ticket, an entrance/exit record and the like from an IC card, a fare adjustment process associated with an entrance process or exit process, and writing of card data to the IC card as shown in FIG. 9A. In this case, the respective processes need to be completed within a period of passage of the user through a ticket gate (short period in which user is bringing IC card close to reader/writer).

A process performed by the information processing system 100 at the time of entrance of the user is shown in FIG. 9B, while a process performed at the time of exit is shown in FIG. 9C. As shown in FIGS. 9B and 9C, the gate controller 104 of the information processing system 100 only performs authentication of identification data (ID) (reading of identification data (ID)) at either entrance or exit of the user. Each fare adjustment process indicated by a shaded portion is performed at the zone server 102.

Accordingly, the information processing system 100 considerably reduces loads imposed on the gate controller 104 in comparison with those of the conventional system. In this case, processing ability necessary for the gate controller 104 is limited, wherefore costs lower accordingly. In general, the information processing system 100 includes a large number of the gate controllers 104, wherefore costs of the whole system considerably lower.

In addition, a part of the entrance process indicated in FIG. 9B may be completed before next exit of the user. For example, while a process such as determination of whether or not entrance is allowed needs to be performed immediately at the time of entrance of the user, post-processing such as reflection of data may be completed before next exit of the user. Similarly, a part of the exit process indicated in FIG. 9C may be completed before next entrance of the user. Then, in general, a time from entrance to exit of the user, and a time from exit to entrance of the user are overwhelmingly longer than the processing time shown in FIGS. 9A, 9B and 9C. For example, all the processes shown in FIG. 9A need to be completed within no longer than one second. However, there is substantially no possibility that the user having entered leaves within one second, for example. In other words, no time limitation is imposed on the entrance process and exit process performed by the information processing system 100. In this case, addition of a wider variety of processes to the entrance process and exit process is easily achievable, wherefore the information processing system 100 more easily realizes addition of new services, system changes and the like. In other words, lowering of flexibility of the system is avoidable.

In addition, the information processing system 100 does not write data to the IC card 121 as shown in FIGS. 9B and 9C. Moreover, data read from the IC card 121 is only the identification data (ID) 211. Accordingly, the information processing system 100 reduces the possibility of processing errors due to failures of short-distance wireless communication with the IC card 121 or for other reasons.

In addition, the entrance process or exit process is performed by the zone server 102 of the information processing system 100. In this case, information such as a negative list need not be distributed to the gate controller 104. Accordingly, processes for the distribution and communication traffics do not increase.

In addition, maintenance of hardware and update of software in the gate controller 104 are more facilitated as a result of reduction of the processes performed by the gate controller 104. Moreover, a large number of processes are performed by the zone server 102, wherefore some processing such as update of software may be performed only for the zone server 102 depending on cases. Accordingly, costs and difficulty levels concerning maintenance of hardware, update of software and the like do not increase.

In addition, the entrance process and exit process are shared between a plurality of the zone servers 102. Accordingly, the information processing system 100 reduces excessive concentration of processing loads and communication traffics, and more easily realizes these processes.

As apparent from above, the information processing system 100 provides a system capable of increasing efficiency while reducing concentration of loads.

2. SECOND EMBODIMENT

<Another Example of Information Processing System Used in Transportation Facilities and Others>

Figure 10A:
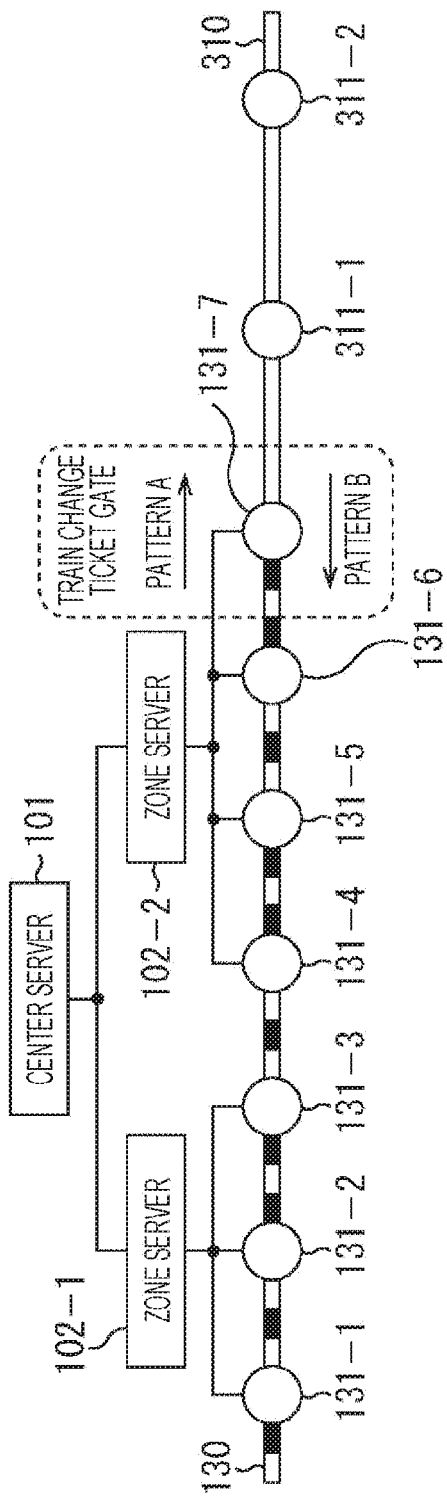
FIGS. 10A and 10B are diagrams showing an example of use cases for a train change.

It is generally difficult, in view of convenience, to use a fare adjustment system of transportation facilities, such as passenger railroads, as a system limited to only one railroad corporation. For example, shifts of a user often cover a plurality of railroad corporations (a plurality of lines). According to an example shown in FIG. 10A, a line 130 of a first railroad corporation and a line 310 of a second railroad corporation connect to an identical station 131-7. A ticket gate for train changes between both the lines (train change gate) is therefore provided in the station 131-7. In this case, shifts of a user may cover the lines of both the railroad corporations as indicated by a pattern FIG. 10A and a pattern FIG. 10B, wherefore fare adjustment is required to handle these patterns.

Figure 10B:
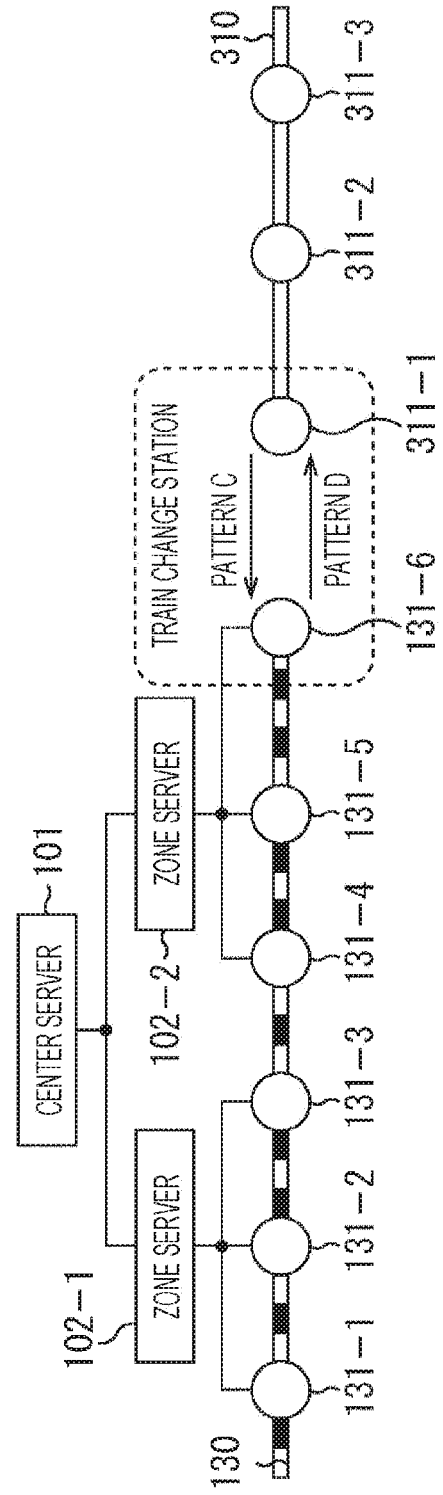

In addition, as shown in an example in FIG. 10B, a user may shift between a station 131-6 connecting to the line 130 and a station 311-1 connecting the line 310 to change trains in a case where the station 131-6 and the station 311-1 are different stations. In this case, shifts of a user similarly cover lines of both the railroad corporations as indicated by a pattern C and a pattern D. Accordingly, fare adjustment needs to handle these patterns.

A user often simply uses a plurality of transportation facilities for other reasons as well, wherefore it is inconvenient for the user to change an IC card for every use of different transportation facilities. In other words, it is preferable to use an IC card common to a larger number of transportation facilities, other facilities, services and the like.

It is practically impossible, however, to unify fare adjustment systems at a time for all of transportation facilities, other facilities, services and the like. It is quite likely that a certain railroad corporation adopts the information processing system 100 according to the present technology described above, and that another railroad corporation adopts a conventional system. Then, even in such a case, it is preferable to allow use of an IC card common to a larger number of transportation facilities, other facilities, services and the like.

Accordingly, the IC card 121 may be configured such that user data used for a conventional system is writable to the IC card 121 to allow use of the IC card 121 in a conventional system. More specifically, IC card 121 may be such an IC card which stores information contained in the user data 250 and used in a conventional system as card data. This information may be any information contained in the user data 250, and may be either a part or all of information contained in the user data 250.

<Configuration Example of Card Data>

Figure 11:
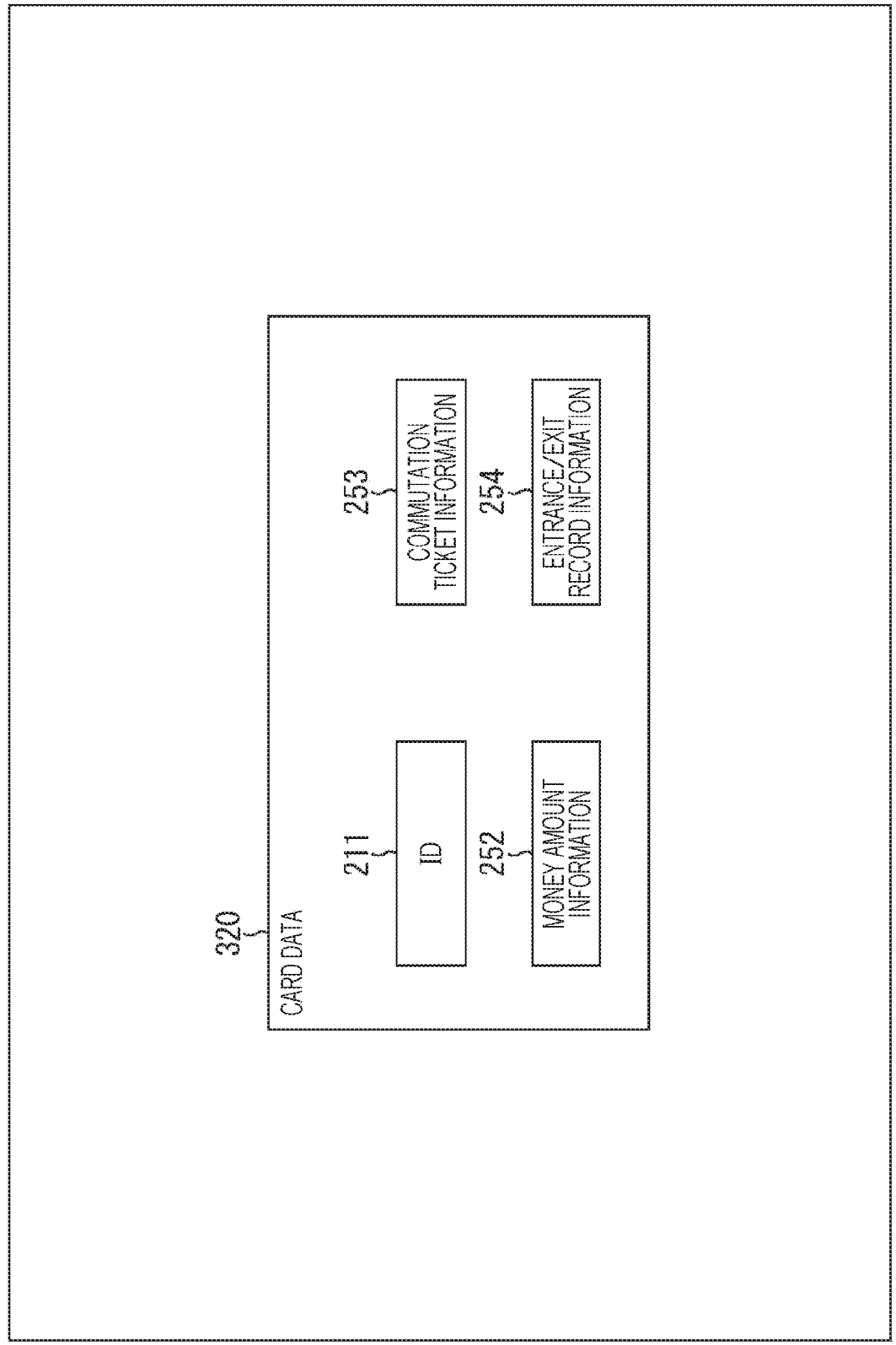
FIG. 11 is a diagram showing a main configuration example of card data.

FIG. 11 is a diagram showing a main configuration example of this card data. As shown in FIG. 11, card data 320 may include the identification data (ID) 211, the money amount information 252, the commutation ticket information 253, and the entrance/exit record information 254. These items of information are identical to the corresponding items of information described in the first embodiment. The money amount information 252, the commutation ticket information 253, and the entrance/exit record information 254 are used for an entrance process or an exit process, and updated even in a conventional system. Accordingly, the IC card 121 storing these items of information as the card data 320 is also usable for a conventional system.

Note that the card data 320 may contain any contents, including information other than the information shown in FIG. 11. For example, the user information 256 may be contained in the card data 320. Moreover, a part of the information shown in FIG. 11 may be omitted.

In addition, the card data 320 is a general name of a data group given for convenience of description, and stored in the storage device (IC card 121) owned by the user. Accordingly, the card data 320 may be given as an actual data structure, or may not be given.

In addition, data reading and updating need not be executed in units of the card data 320. Various types of data contained in the card data 320 may be read from the IC card 121 or updated in accordance with necessities.

In addition, the card data 320 is data stored in the storage device owned by the user, and is similarly applicable to the storage device even in a case where the storage device is not a contactless type IC card. More specifically, the name "card data" used herein and named from the IC card 121 presented as an example of the storage device does not mean that "the storage device owned by the user is limited to a contactless type IC card". The card data 320 is therefore applicable to any types of devices. In other words, the name of the card data 320 may be any names other than the "card data".

<Function Blocks of Respective Configurations>

Figure 12:
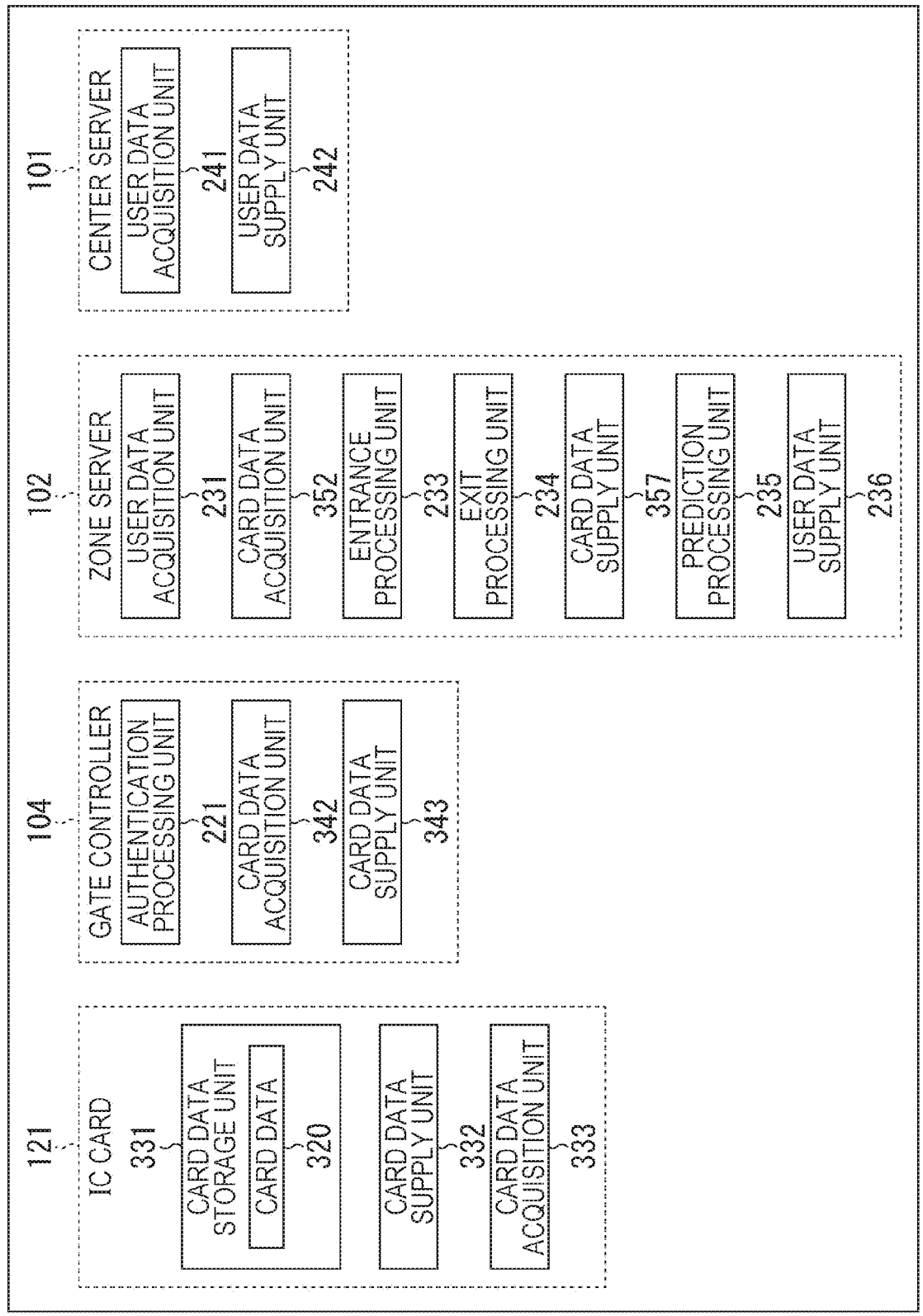
FIG. 12 is a function block diagram showing an example of main functions included in respective devices.

FIG. 12 shows a configuration example of function blocks indicating functions realized by the IC card 121, the gate controller 104, the zone server 102, and the center server 101 in this example. These configurations may be realized by execution of programs or processing of data, for example.

As shown in FIG. 12, the IC card 121 in this example realizes a card data storage unit 331, a card data supply unit 332, a card data acquisition unit 333, and others. The card data storage unit 331 stores the card data 320. The card data storage unit 331 is realized by the storage unit 181 under control by the information processing unit 182.

The card data supply unit 332 performs a process relating to supply of the card data 320 stored in the card data storage unit 331. The card data supply unit 332 is realized by the storage unit 181 and the wireless communication unit 183 under control by the information processing unit 182. For example, the card data supply unit 332 reads the card data 320 from the card data storage unit 331 (storage unit 181), and supplies the card data 320 to the gate controller 104 via the wireless communication unit 183 (via reader/writer 105).

The card data acquisition unit 333 performs a process relating to acquisition of card data. The card data acquisition unit 333 is realized by the storage unit 181 and the wireless communication unit 183 under control by the information processing unit 182. For example, the card data acquisition unit 333 acquires the card data 320 supplied from the gate controller 104 via the wireless communication unit 183 (via reader/writer 105), and supplies the card data 320 to the data storage unit 331 (storage unit 181) to store the card data 320 therein.

In addition, the gate controller 104 in this example realizes function blocks such as the authentication processing unit 221, a card data acquisition unit 342, and a card data supply unit 343. The card data acquisition unit 342 performs a process relating to acquisition of the card data 320 supplied from the IC card 121. The card data acquisition unit 342 is executed by processing and control over the communication unit 164 by the CPU 151. For example, the card data acquisition unit 342 acquires the card data 320 supplied from the IC card 121 via the communication unit 164 (via reader/writer 105). For example, the card data acquisition unit 342 further acquires the card data 320 supplied from the zone server 102 via the communication unit 164 (via station server 103).

The card data supply unit 343 performs a process relating to supply of the card data 320. For example, the card data supply unit 343 is executed by processing and control over the communication unit 164 by the CPU 151. For example, the card data supply unit 343 supplies the card data acquired by the card data acquisition unit 342 to the zone server 102 via the communication unit 164 (via station server 103). For example, the card data supply unit 343 further supplies the card data acquired by the card data acquisition unit 342 to the IC card 121 via the communication unit 164 (via reader/writer 105).

In addition, the zone server 102 in this example realizes function blocks such as the user data acquisition unit 231, a card data acquisition unit 352, the entrance processing unit 233, the exit processing unit 234, a card data supply unit 357, the prediction processing unit 235, and the user data supply unit 236.

The card data acquisition unit 352 performs a process relating to acquisition of the card data 320 supplied from the gate controller 104. For example, the card data acquisition unit 352 is executed by processing and control over the communication unit 164 by the CPU 151. For example, the card data acquisition unit 352 acquires the card data 320 (at least identification data (ID) 211) supplied from the gate controller 104 via the communication unit 164 (via station server 103).

The card data supply unit 357 performs a process relating to supply of the card data 320 corresponding to the user data 250 updated by the entrance process or exit process. For example the card data supply unit 357 is executed by processing and control over the database 112 (or storage unit 163) and the communication unit 164 by the CPU 151. For example, the card data supply unit 357 supplies a part or the whole of information contained in the user data updated by the entrance process or exit process to the gate controller 104 as the card data 320 via the communication unit 164 (via station server 103).

In addition, the center server 101 in this example realizes function blocks such as the user data acquisition unit 241 and the user data supply unit 242, similarly to the first embodiment.

Note that data to be stored in the database 111 and the database 112, and configurations of the user data and the like are similar to those of the first embodiment.

<Flow of Process Relating to Entrance>

Figure 13:
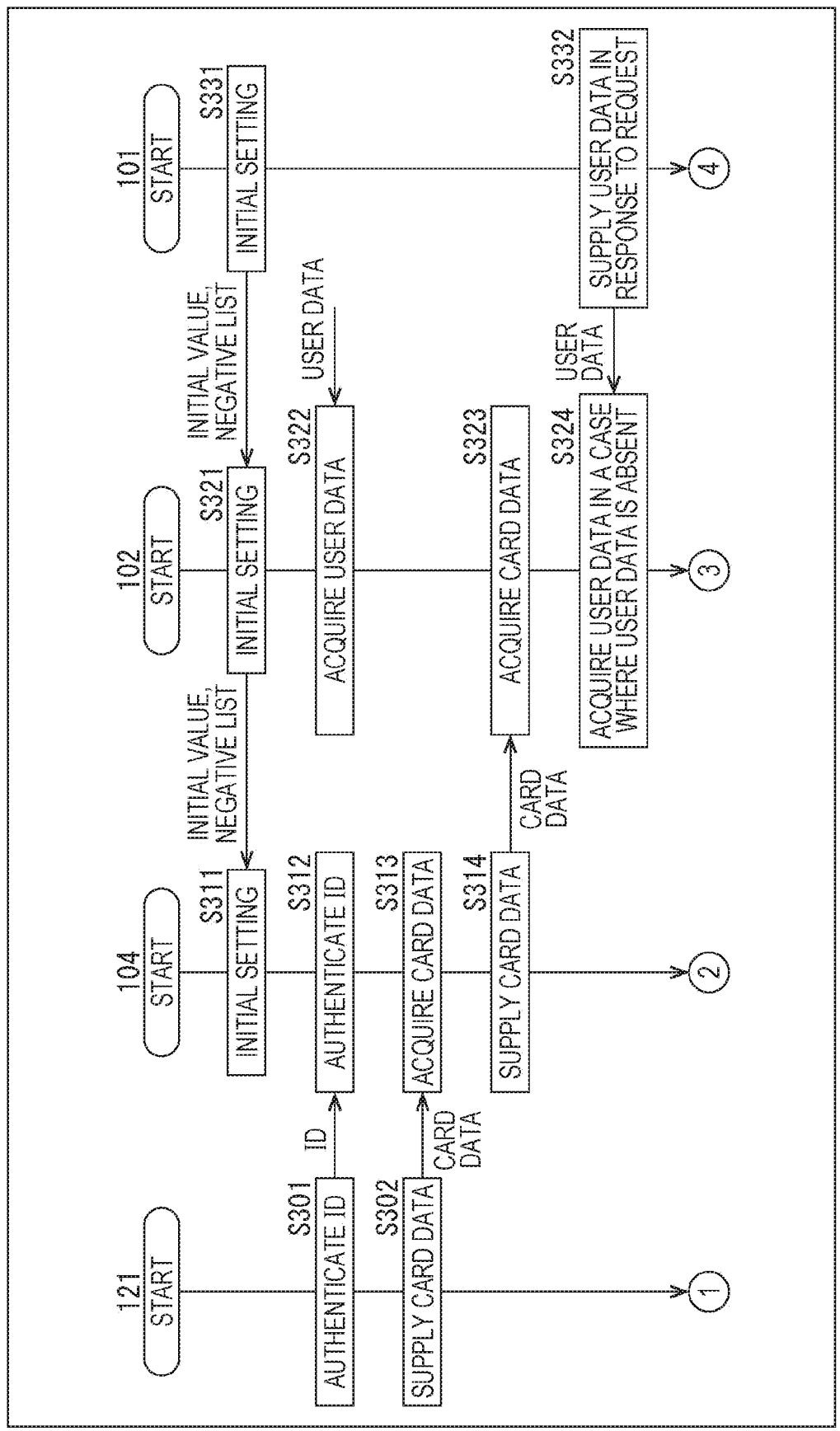
FIG. 13 is a flowchart showing a flow example of a process relating to entrance of a user.

An example flow of a process relating to entrance of the user and executed by the information processing system described above is hereinafter described with reference to a flowchart shown in FIGS. 13 and 14.

Initially, the gate controller 104, the zone server 102, and the center server 101 initialize settings at a start or other occasions (step S311, step S321, step S331 in FIG. 13), whereafter the center server 101 supplies initial values and a negative list (list of identification data (ID) 211 associated with dishonest processing) to the zone server 102. Note that the negative list may be also supplied to the gate controller 104.

In addition, the user data acquisition unit 231 of the zone server 102 acquires the user data 250 before execution of the entrance process (before step S324) (step S322). The user data 250 is supplied on the basis of prediction data corresponding to the identification data (ID) 211. The user data 250 is supplied from the different zone server 102 or center server 101, for example. The acquired user data 250 is stored in the database 112 (or storage unit 163 of zone server 102).

When passing through a ticket gate and entering therethrough, the user brings the IC card 121 owned by the user close to the reader/writer 105 of an automatic ticket gate. In this case, the card data supply unit 332 of the IC card 121 performs an ID authentication process, and supplies the identification data (ID) 211 contained in the card data 320 stored in the card data storage unit 331 to the gate controller 104 (step S301).

The authentication processing unit 221 of the gate controller 104 having acquired the identification data (ID) 211 performs an authentication process for the acquired identification data (ID) 211 (step S312). Then, when the identification data (ID) 211 is authenticated, the card data supply unit 332 of the IC card 121 supplies the card data 320 stored in the card data storage unit 331 to the gate controller 104 (step S302).

The card data acquisition unit 342 of the gate controller 104 acquires the card data 320 (step S313). Thereafter, the card data supply unit 343 supplies the card data 320 acquired by the card data acquisition unit 342 to the zone server 102 (step S314).

The card data acquisition unit 352 of the zone server 102 acquires the card data 320 (step S323). The user data acquisition unit 231 checks whether the user data 250 corresponding to the acquired card data 320 (identification data (ID) 211 contained in card data 320) has been stored in the database 112 (or storage unit 163 of the zone server 102). Then, in a case where the user data 250 is absent in the database 112 (or storage unit 163 of zone server 102), i.e., in a case where prediction of the zone server 102 is wrong, the user data acquisition unit 231 acquires the user data 250 corresponding to the acquired identification data (ID) 211 from the center server 101 (step S324).

The user data supply unit 242 of the center server 101 supplies the requested user data 250 to the zone server 102 in response to a request from the user data acquisition unit 231 of the zone server 102 (step S332).

Figure 14:
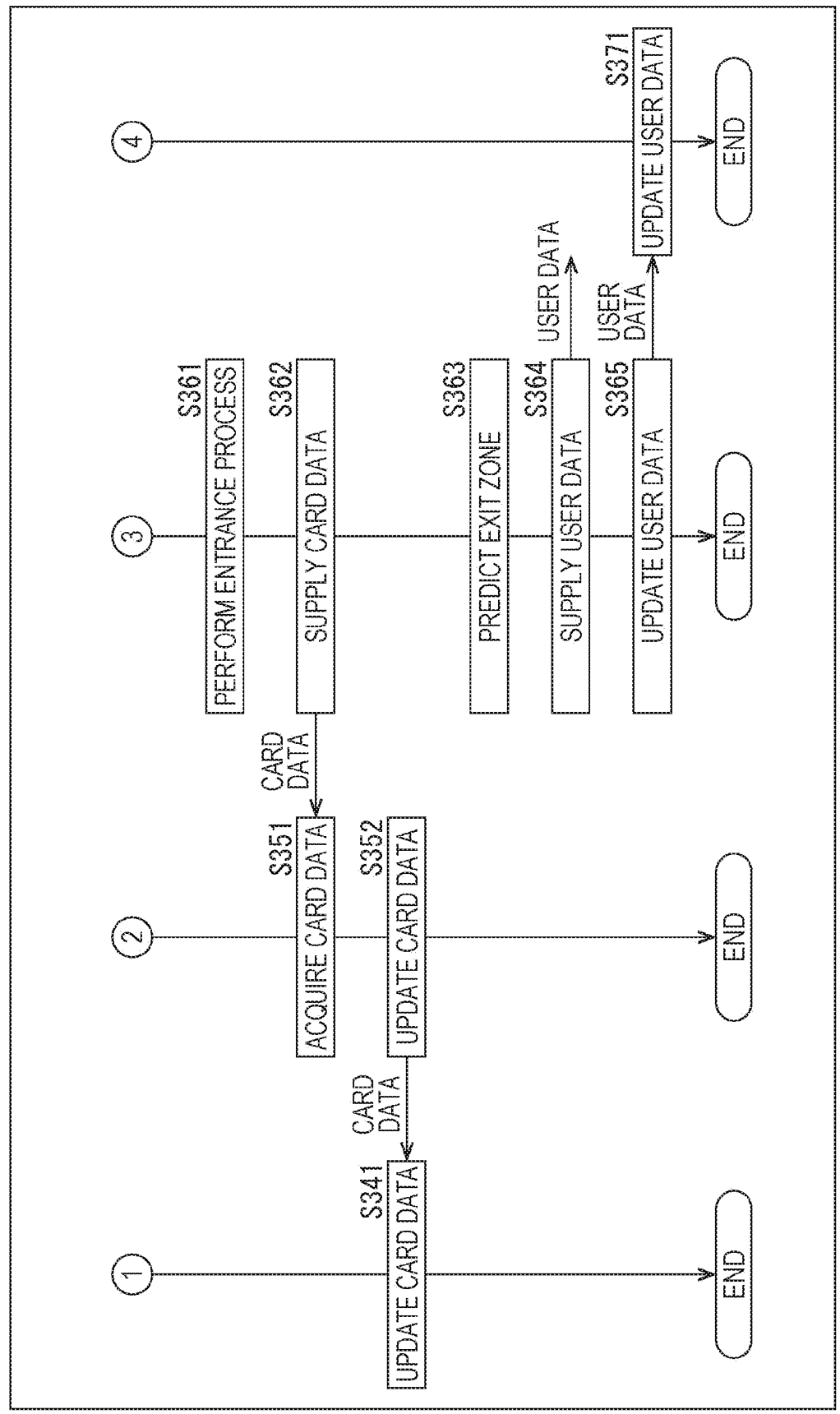
FIG. 14 is a flowchart showing the flow example of the process relating to entrance of the user, and continuing from FIG. 13.

When the current user data 250 is prepared in the foregoing manner, the entrance processing unit 233 of the zone server 102 performs the entrance process, and updates the current user data 250 corresponding to the processing target as necessary (step S361 in FIG. 14).

Note that, in a case where information for a different system (such as card data 320) is used in a system as in this embodiment, it may be necessary to distinguish between a state that the exit process immediately before the entrance process has been performed by the system (information processing system 100) or by the conventional different system. In this case, the entrance processing unit 233 may make this distinction on the basis of a comparison between data acquired from the IC card 121 and server data (data acquired from different zone server 102 or center server 101) in the entrance process. Alternatively, the entrance processing unit 233 may make this distinction on the basis of a comparison between data acquired from the IC card 121 (such as entrance/exit record information 254) and server data only in a case where data inconsistency is detected by checking consistency of data (checking whether or not entrance process has been normally performed) acquired from the IC card 121 in the entrance process.

After completion of the entrance process, the card data supply unit 357 supplies a part or the whole of information contained in the updated user data 250 to the gate controller 104 as the updated card data 320 (step S362). The card data acquisition unit 342 of the gate controller 104 acquires the card data 320 (step S351). Thereafter, the card data supply unit 343 supplies the acquired card data 320 to the IC card 121 to update the card data 320 stored in the IC card 121 to the supplied card data 320 (step S352). The card data acquisition unit 333 of the IC card 121 acquires the supplied card data 320, and supplies the card data 320 to the card data storage unit 331 to update (rewrite) the card data 320 stored in the card data storage unit 331 (step S341).

In addition, the prediction processing unit 235 of the zone server 102 predicts a subsequent spot of exit of the user of the IC card 121 corresponding to the identification data (ID) 211 for which the entrance process has been performed (step S363). More specifically, the prediction processing unit 235 predicts the zone server 102 to which the gate controller 104 belongs, as the gate controller subsequently reading the card data 320 (at least identification data (ID) 211) from the IC card 121, on the basis of prediction data contained in the user data 250 updated by the entrance process (such as commutation ticket information 253 and behavior history 255).

After completion of the prediction, the user data supply unit 236 supplies the user data 250 updated by the entrance process to the zone server 102 predicted as the one to which the gate controller 104 belongs, as the gate controller subsequently reading the card data 320 (at least identification data (ID) 211) from the IC card 121 (step S364).

In addition, the user data supply unit 236 further supplies the user data 250 updated by the entrance process to the center server 101 to update the user data 250 stored in the database 111 and the like and managed by the center server 101 (step S365).

The user data acquisition unit 241 of the center server 101 acquires the user data 250, and updates the user data 250 managed (stored) in the database 111 and the like (reflect update of user data 250) on the basis of the user data 250 (step S371).

The information processing system 100 performs the process relating to entrance in the manner described above.

<Flow of Process Relating to Exit>

Figure 15:
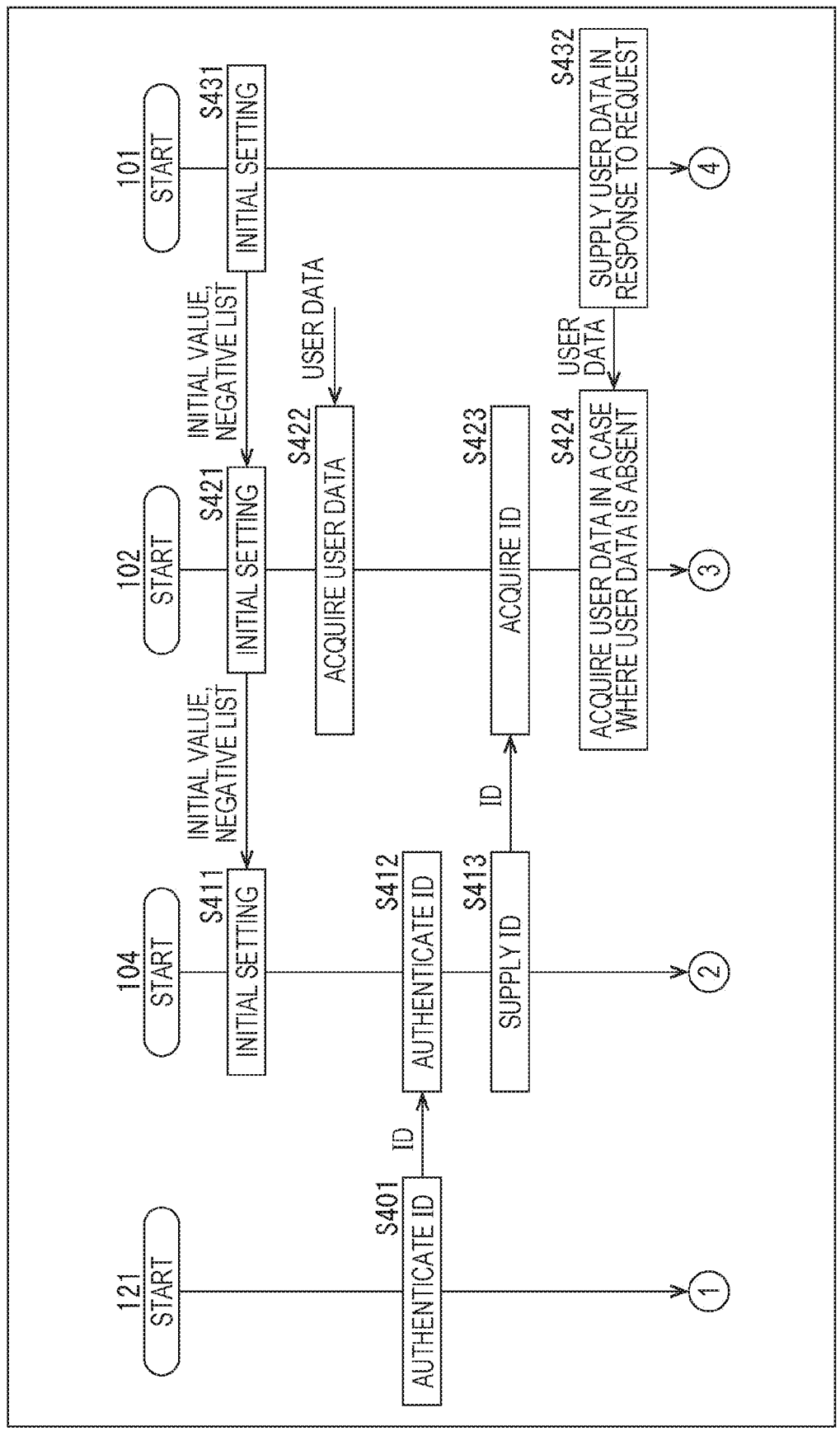
FIG. 15 is a flowchart showing a flow example of a process relating to exit of a user.

An example flow of a process relating to exit of the user and executed by the information processing system described above is hereinafter described with reference to a flowchart shown in FIGS. 15 and 16.

Initially, the gate controller 104, the zone server 102, and the center server 101 initialize settings at a start or other occasions (step S411, step S421, step S431 in FIG. 15), whereafter the center server 101 supplies initial values and a negative list (list of identification data (ID) 211 associated with dishonest processing) to the zone server 102. Note that the negative list may be also supplied to the gate controller 104.

In addition, the user data acquisition unit 231 of the zone server 102 acquires the user data 250 before execution of the entrance process (before step S424) (step S422). The user data 250 is supplied on the basis of prediction data corresponding to the identification data (ID) 211. The user data 250 is supplied from the different zone server 102 or center server 101, for example. The acquired user data 250 is stored in the database 112 (or storage unit 163 of zone server 102).

When passing through a ticket gate and leaving therefrom, the user brings the IC card 121 owned by the user close to the reader/writer 105 of an automatic ticket gate. In this case, the card data supply unit 332 of the IC card 121 performs an ID authentication process, and supplies the identification data (ID) 211 contained in the card data 320 stored in the card data storage unit 331 to the gate controller 104 (step S401).

The authentication processing unit 221 of the gate controller 104 having acquired the identification data (ID) 211 performs an authentication process for the acquired identification data (ID) 211 (step S412). Then, when the identification data (ID) 211 is authenticated, the card data supply unit 343 supplies the identification data (ID) 211 to the zone server 102 (step S413).

The card data acquisition unit 352 of the zone server 102 acquires the identification data (ID) 211 (step S423). The user data acquisition unit 231 checks whether the user data 250 corresponding to the identification data (ID) 211 acquired by the card data acquisition unit 352 has been stored in the database 112 (or storage unit 163 of zone server 102). Then, in a case where the user data 250 is absent in the database 112 (or storage unit 163 of zone server 102), i.e., in a case where prediction of the zone server 102 is wrong, the user data acquisition unit 231 acquires the user data 250 corresponding to the acquired identification data (ID) 211 from the center server 101 (step S424).

The user data supply unit 242 of the center server 101 supplies the requested user data 250 to the zone server 102 in response to a request from the user data acquisition unit 231 of the zone server 102 (step S432).

Figure 16:
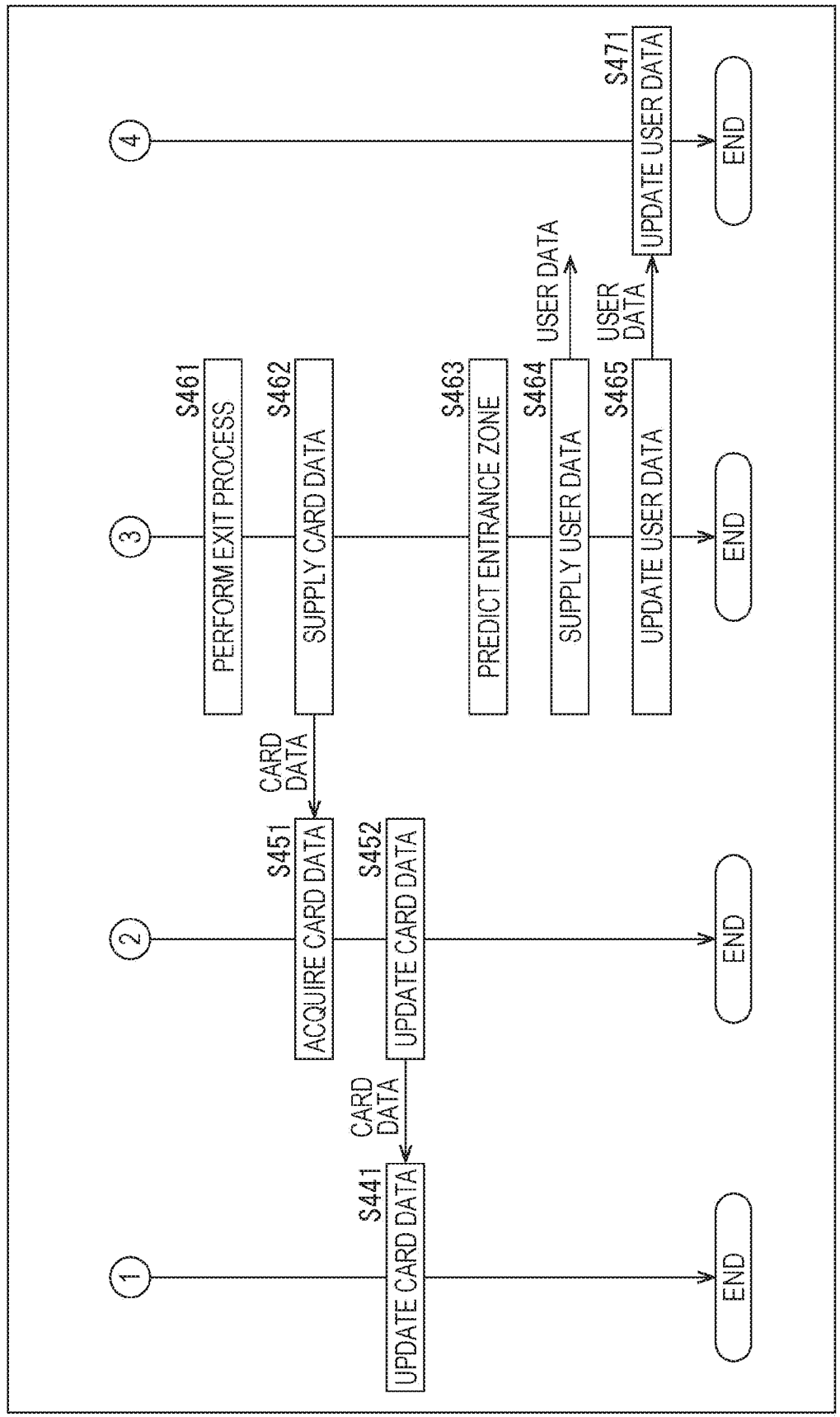
FIG. 16 is a flowchart showing the flow example of the process relating to exit of the user, and continuing from FIG. 13.

When the current user data 250 is prepared in the foregoing manner, the exit processing unit 234 of the zone server 102 performs the exit process, and updates the current user data 250 corresponding to the processing target as necessary (step S461 in FIG. 16).

After completion of the exit process, the card data supply unit 357 supplies a part or the whole of information contained in the updated user data 250 to the gate controller 104 as the updated card data 320 (step S462). The card data acquisition unit 342 of the gate controller 104 acquires the card data 320 (step S451). Thereafter, the card data supply unit 343 supplies the acquired card data 320 to the IC card 121 to update the card data 320 stored in the IC card 121 to the supplied card data 320 (step S452). The card data acquisition unit 333 of the IC card 121 acquires the supplied card data 320, and supplies the card data 320 to the card data storage unit 331 to update (rewrite) the card data 320 stored in the card data storage unit 331 (step S441).

In addition, the prediction processing unit 235 of the zone server 102 predicts a subsequent spot of entrance of the user of the IC card 121 corresponding to the identification data (ID) 211 for which the entrance process has been performed (step S463). More specifically, the prediction processing unit 235 predicts the zone server 102 to which the gate controller 104 belongs, as the gate controller 104 subsequently reading the card data 320 (at least identification data (ID) 211) from the IC card 121, on the basis of prediction data contained in the user data 250 updated by the exit process (such as commutation ticket information 253 and behavior history 255).

After completion of the prediction, the user data supply unit 236 supplies the user data 250 updated by the exit process to the zone server 102 predicted as the one to which the gate controller 104 belongs, as the gate controller 104 subsequently reading the card data 320 (at least identification data (ID) 211) from the IC card 121 (step S464).

In addition, the user data supply unit 236 further supplies the user data 250 updated by the entrance process to the center server 101 to update the user data 250 stored in the database 111 and the like and managed by the center server 101 (step S465).

The user data acquisition unit 241 of the center server 101 acquires the user data 250, and updates the user data 250 managed (stored) in the database 111 and the like (reflect update of user data 250) on the basis of the user data 250 (step S471).

The information processing system 100 performs the process relating to exit in the manner described above.

<Comparison between Processes for Entrance and Exit>

Figures 17A, 17B, 17C:
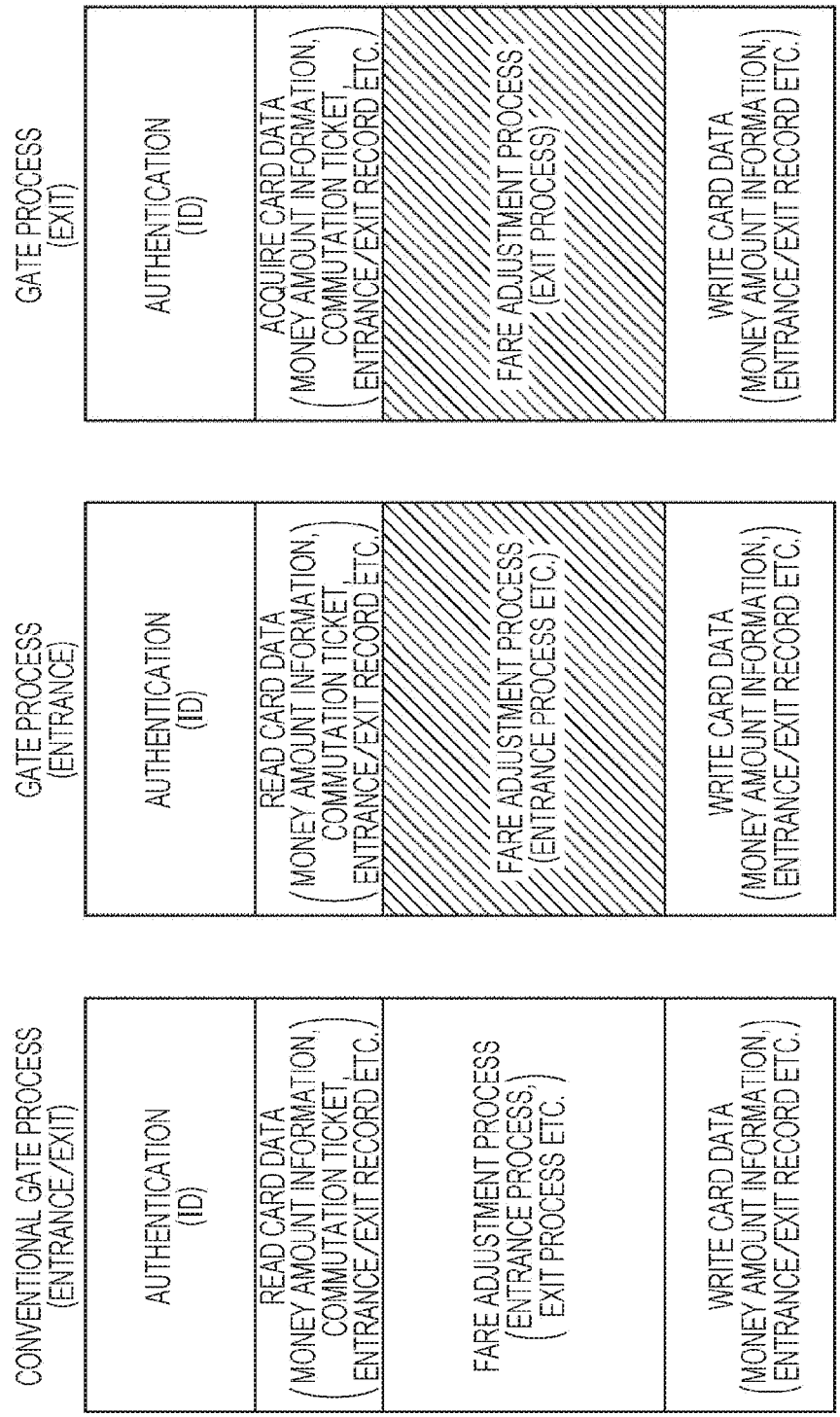
FIGS. 17A, 17B and 17C are diagrams showing a comparative example of contents and procedures of the processes.

FIGS. 17A, 17B and 17C are diagrams showing a comparison of entrance and exit processes between a conventional fare adjustment system and the information processing system 100 to which the present technology has been applied.

According to the conventional system, a gate controller performs all of authentication of identification data (ID) (reading of identification data (ID)), reading of money amount information, a commutation ticket, an entrance/exit record and the like from an IC card, a fare adjustment process associated with an entrance process or exit process, and writing of card data to an IC card as shown in FIG. 17A.

In this case, the respective processes need to be completed within a period of passage of the user through a ticket gate (short period in which user is bringing IC card close to reader/writer).

A process performed by the information processing system 100 at the time of entrance of the user is shown in FIG. 17B, while a process performed at the time of exit is shown in FIG. 17C. As shown in FIGS. 17B and 17C, the gate controller 104 of the information processing system 100 only performs authentication of identification data (ID) (reading of identification data (ID)), reading of card data, and writing of card data at either entrance or exit of the user. Each fare adjustment process (entrance process or exit process) indicated by a shaded portion is performed at the zone server 102.

In this case, the information processing system 100 considerably reduces loads imposed on the gate controller 104 in comparison with the conventional system, and achieves cost reduction, similarly to above according to this embodiment. Accordingly, considerable cost reduction of the whole system is realizable.

In addition, the number of the provided zone servers 102 is generally smaller than the number of the provided gate controllers 104. In this case, performance of the zone servers 102 improves at a lower cost in comparison with the gate controllers 104. Accordingly, processing speeds of the entrance process and the exit process are allowed to increase without raising costs. In addition, the gate controller 104 is allowed to perform other processes while the zone server 102 is performing the fare adjustment process. In this case, limitations imposed on the processing time of the information processing system 100 are fewer than those of the conventional system. Accordingly, the information processing system 100 is allowed to more easily add processes, and therefore more easily achieve add new services or system changes. In other words, lowering of flexibility of the system is avoidable.

In addition, the entrance process or exit process is performed by the zone server 102 of the information processing system 100. In this case, information such as a negative list need not be distributed to the gate controller 104. Accordingly, processes for the distribution and communication traffics do not increase.

In addition, maintenance of hardware and update of software in the gate controller 104 are more facilitated as a result of reduction of the processes performed by the gate controller 104. Moreover, a large number of processes are performed by the zone server 102, wherefore some processing such as update of software may be performed only for the zone server 102 depending on cases. Accordingly, costs and difficulty levels concerning maintenance of hardware, update of software and the like do not increase.

In addition, the entrance process and exit process are shared between a plurality of the zone servers 102. Accordingly, the information processing system 100 reduces excessive concentration of processing loads and communication traffics, and more easily realizes these processes.

As apparent from above, the information processing system 100 provides a system capable of increasing efficiency while reducing concentration of loads.

<Software>

A series of processes described above may be executed either by hardware or by software. In a case where the series of processes described above is executed by software, programs constituting the software are installed from a network or a recording medium.

For example, this recording medium is constituted by the removable medium 171 including recorded programs and distributed to a user to deliver the programs separately from the device body as shown in FIG. 3. The removable medium 171 includes a magnetic disk (including flexible disk), and an optical disk (including CD-ROM and DVD). The removable medium 171 further includes a magneto-optical disk (such as mini disc (MD)), a semiconductor memory and the like.

For example, under attachment of the removable medium 171 to the drive 165, programs stored in the removable medium 171 may be read by the drive 165, and installed in the storage unit 163 in each of the devices such as the center server 101, the zone server 102, the station server 103, and the gate controller 104.

Alternatively, the programs may be provided via a wired or wireless transmission medium such as a local area network, the Internet, and digital satellite broadcasting. For example, the programs may be received by the communication unit 164, and installed in the storage unit 163 in each of the devices such as the center server 101, the zone server 102, the station server 103, and the gate controller 104. Furthermore, incase of the IC card 121, for example, the programs may be received by the wireless communication unit 183 via the reader/writer 105 and the antenna 184, and installed in the storage unit 181.

Alternatively, the programs may be installed beforehand. For example, the programs may be installed beforehand in the storage unit 163, the ROM 152 or the like in each of the devices such as the center server 101, the zone server 102, the station server 103, and the gate controller 104. Furthermore, in case of the IC card 121, for example, the programs may be installed in the storage unit 181 beforehand.

Note that the programs executed by the computer may be programs under which processes are executed in time series in the order described in the present specification, or executed in parallel or at necessary timing such as on occasions of calls.

Further, the steps describing the programs recorded in a recording medium contain not only processes executed in time series in the order discussed herein, but also processes executed in parallel or individually, rather than executed in time series.

In addition, the processes in the respective steps described above may be executed either by the respective devices described above, or arbitrary devices other than the respective devices described above. In this case, the devices executing the processes are configured to perform functions (function blocks or the like) necessary for executing the processes. The devices executing the processes are also configured to receive transmission of information necessary for the processes.

<Others>

Further, according to the present specification, the system refers to a collection of multiple constituent elements (such as devices and modules (parts)), and includes both cases where all the constituent elements are contained in the same housing, and where some of the constituent elements are not contained in the same housing. Accordingly, multiple devices accommodated in separate housings and connected via a network, and one device including multiple modules accommodated within one housing are both regarded as systems.

Furthermore, according to the foregoing description, a configuration discussed as one device (or processing unit) may be divided into multiple devices (or processing units). On the contrary, the configuration discussed as multiple devices (or processing units) may be combined into one device (or processing unit). Needless to say, configurations not discussed herein may be added to the configurations of the respective devices (or respective processing units). In addition, when the configuration and operation of the whole system are substantially identical, a part of a configuration of a certain device (or pressing unit) may be incorporated into a configuration of another device (or another processing unit).

While the preferred embodiments according to the present disclosure have been described in detail with reference to the accompanying drawings, the technical scope of the present disclosure is not limited to these examples. It is obvious that various examples of changes and modifications may be presented by those having ordinary knowledge in the technical field of the present disclosure in the light of the present technology within the scope of the technical spirit described in the claims. It is therefore understood that these changes and modifications are also contained in the technical range of the present disclosure as a matter of course.

For example, the present technology is applicable to a system of cloud computing where one function is shared by multiple devices and processed in cooperation with one another via a network.

Moreover, the respective steps discussed with reference to the foregoing flowcharts may be shared and executed by multiple devices rather than executed by one device.

Furthermore, in a case where multiple processes are contained in one step, the multiple processes contained in the one step may be shared and executed by multiple devices rather than executed by one device.

In addition, the present technology may be practiced by any configurations mounted on the foregoing devices or devices constituting the foregoing systems, such as a processor functioning as a system large scale integration (LSI), a module including a plurality of processors, a unit including a plurality of modules, and a set adding other functions to a unit (i.e., configuration of a part of device).

Note that the present technology may have the following configurations.

(1) An information processing system including:
one or a plurality of center servers to each of which one or more zone servers are allocated;
a plurality of the zone servers each of which belongs to one or more of the center servers, one or more gate controllers different from each other being allocated to each of the zone servers; and
a plurality of the gate controllers each of which belongs to the corresponding zone server, and communicates with a storage device, in which
each of the center servers includes a management unit that manages user data that is data about a user on the basis of identification data,
each of the zone servers includes
a user data acquisition unit that acquires the user data that corresponds to the identification data and is supplied on the basis of prediction data corresponding to the identification data,
a first identification data acquisition unit that acquires the identification data from the gate controller allocated to the corresponding zone server, and
a user data processing unit that processes the user data that corresponds to the identification data acquired by the first identification data acquisition unit and is acquired by the user data acquisition unit, and each of the gate controllers includes
a second identification data acquisition unit that acquires the identification data from the storage device that stores the identification data, and
an identification data supply unit that supplies the identification data acquired by the second identification data acquisition unit to the zone server to which the corresponding gate controller belongs.

(2) An information processing method for an information processing system that includes
one or a plurality of center servers to each of which one or more zone servers are allocated,
a plurality of zone servers each of which belongs to one or more of the center servers, one or more gate controllers different from each other being allocated to each of the zone servers, and
a plurality of the gate controllers each of which belongs to the corresponding zone server, and communicates with a storage device, in which
each of the center servers manages user data that is data about a user on the basis of identification data,
each of the zone servers acquires the user data corresponding to the identification data and supplied on the basis of prediction data corresponding to the identification data, acquires the identification data from the gate controller allocated to the corresponding zone server, and processes the acquired user data that corresponds to the acquired identification data, and
each of the gate controllers acquires the identification data from the storage device that stores the identification data, and supplies the acquired identification data to the zone server to which the corresponding gate controller belongs.

(3) An information processing device that belongs to one or more center servers, one or more gate controllers being allocated to the information processing device, the information processing device including:
a user data acquisition unit that acquires user data that is data about a user corresponding to identification data, and is supplied on the basis of prediction data corresponding to the identification data;
an identification data acquisition unit that acquires the identification data that is read from a storage device storing the identification data, and is supplied from the gate controller allocated to the information processing device; and
a user data processing unit that processes the user data that corresponds to the identification data acquired by the identification data acquisition unit and is acquired by the user data acquisition unit.

(4) The information processing device according to (3), in which the user data acquisition unit acquires the user data that is supplied, on the basis of the prediction data, from a different information processing device that belongs to one or more center servers, one or more gate controllers different from each other being allocated to the different information processing device.

(5) The information processing device according to (3) or (4), in which the user data acquisition unit acquires the user data supplied from the corresponding center server on the basis of the prediction data.

(6) The information processing device according to any one of (3) through (5), in which the user data acquisition unit acquires the user data from the corresponding center server in a case where the user data that corresponds to the identification data acquired by the identification data acquisition unit is not supplied.

(7) The information processing device according to any one of (3) through (6), in which the prediction data is data used for prediction of the information processing device to which the gate controller belongs, the gate controller subsequently reading the identification data from the storage device, and on the basis of the prediction data, the user data acquisition unit acquires the user data supplied in accordance with prediction that the information processing device is the information processing device to which the gate controller belongs, the gate controller subsequently reading the identification data from the storage device.

(8) The information processing device according to (7), in which the prediction data contains data that relates to a behavior history of a user of the storage device that stores the identification data corresponding to the prediction data, and on the basis of the data relating to the behavior history of the user, the user data acquisition unit acquires the user data supplied in accordance with prediction that the information processing device is the information processing device to which the gate controller belongs, the gate controller subsequently reading the identification data from the storage device.

(9) The information processing device according to (7) or (8), in which the prediction data contains data that relates to a commutation ticket of a user of the storage device that stores the identification data corresponding to the prediction data, and on the basis of the data relating to the commutation ticket of the user, the user data acquisition unit acquires the user data supplied in accordance with prediction that the information processing device is the information processing device to which the gate controller belongs, the gate controller subsequently reading the identification data from the storage device.

(10) The information processing device according to any one of (3) through (9), in which the user data contains the identification data, and data that relates to a history of entrance and exit of a user, and the user data processing unit updates the data that relates to the history of the entrance and exit, and is contained in the user data corresponding to the identification data acquired by the identification data acquisition unit.

(11) The information processing device according to (10), in which the user data further contains data that relates to an amount of registered electronic money, and on the basis of entrance or exit of the user corresponding to the identification data acquired by the identification data acquisition unit, the user data processing unit updates the data that relates to the amount of the registered electronic money, and is contained in the user data of the user.

(12) The information processing device according to (11), in which the user data further contains data that relates to a commutation ticket, and on the basis of entrance or exit of the user corresponding to the identification data acquired by the identification data acquisition unit, and the data relating to the commutation ticket, the user data processing unit updates the data that relates to the amount of the registered electronic money and is contained in the user data of the user as necessary.

(13) The information processing device according to any one of (3) through (12), further including:

a prediction unit that predicts the information processing device to which the gate controller belongs, the gate controller subsequently reading the identification data from the storage device; and a user data supply unit that supplies the user data processed by the user data processing unit to a different information processing device predicted by the prediction unit as the information processing device to which the gate controller belongs, the gate controller subsequently reading the identification data from the storage device.

(14) The information processing device according to (13), in which the user data supply unit further supplies the user data processed by the user data processing unit to the corresponding center server.

(15) The information processing device according to any one of (3) through (14), in which the user data contains data that relates to a history of entrance and exit of a user, the identification data acquisition unit acquires data that relates to the history of the entrance and exit of the user, is read from the storage device, and is supplied from the gate controller allocated to the information processing device, and the user data processing unit updates the data that relates to the history of the entrance and exit of the user and is contained in the user data corresponding to the identification data, and the data that relates to the history of the entrance and exit of the user and is acquired by the identification data acquisition unit.

(16) The information processing device according to any one of (3) through (15), in which the user data contains data that relates to an amount of registered electronic money, the identification data acquisition unit acquires the data that relates to the amount of the registered electronic money, is read from the storage device, and is supplied from the gate controller allocated to the information processing device, and the user data processing unit updates the data that relates to the amount of the registered electronic money and is contained in the user data corresponding to the identification data, and the data that relates to the amount of the registered electronic money and is acquired by the identification data acquisition unit.

(17) The information processing device according to (16), in which the user data further contains data that relates to a commutation ticket, and the user data processing unit updates the data that relates to the amount of the registered electronic money and is contained in the user data, and the data that relates to the amount of the registered electronic money and is acquired by the identification data acquisition unit as necessary on the basis of entrance or exit of the user and the data relating to the commutation ticket.

(18) The information processing device according to any one of (3) through (17), in which the gate controller allocated to the information processing device is provided in a physical area different from a physical area where a gate controller allocated to a different information processing device is provided.

(19) The information processing device according to any one of (3) through (18), further including a storage unit that stores the user data.

(20) An information processing method that belongs to one or more center servers, one or more gate controllers different from each other being allocated to the information processing method, the information processing method including:

acquiring user data that relates to data about a user corresponding to identification data, and is supplied on the basis of prediction data corresponding to the identification data;

acquiring the identification data that is read from a storage device storing the identification data, and is supplied from the gate controller allocated to the information processing method; and processing the acquired user data that corresponds to the acquired identification data.

REFERENCE SIGNS LIST

100 Information processing system
101 Center server
102 Zone server
103 Station server
104 Gate controller
105 Reader/writer
111 Database
112 Database
121 IC card
130 Line
131 Station
151 CPU
152 ROM
153 RAM
154 Bus
160 Input/output interface
161 Input unit
162 Output unit
163 Storage unit
164 Communication unit
165 Drive
171 Removable medium
181 Storage unit
182 Information processing unit
183 Wireless communication unit
184 Antenna
201 ID storage unit
202 ID supply unit
211 Identification data (ID)
221 Authentication processing unit
222 ID supply unit
231 User data acquisition unit
232 ID acquisition unit
233 Entrance processing unit
234 Exit processing unit
235 Prediction processing unit
236 User data supply unit
241 User data acquisition unit
242 User data supply unit
252 Money amount information
253 Commutation ticket information
254 Entrance/exit record information
255 Behavior history
256 User information
310 Line
311 Station
320 Card data
331 Card data storage unit
332 Card data supply unit
333 Card data acquisition unit
342 Card data acquisition unit
343 Card data supply unit
352 Card data acquisition unit
357 Card data supply unit

The invention claimed is:

1. An information processing system, comprising:
at least one center server;
a plurality of zone servers, wherein each of the at least one center server is associated with at least one zone server of the plurality of zone servers; and
a plurality of gate controllers, wherein
each of the plurality of gate controllers is associated with a respective zone server of the plurality of zone servers,
the plurality of gate controllers is configured to communicate with a storage device,
each of the at least one center server is configured to manage user data based on identification data,
the identification data corresponds to identification of the storage device,
each of the plurality of zone servers is configured to:
acquire the user data that corresponds to the identification data, wherein the acquired user data is based on prediction data that corresponds to the identification data;
acquire the identification data from a respective gate controller of the plurality of gate controllers;
process the user data that corresponds to the identification data acquired from the respective gate controller;
predict a specific zone server of the plurality of zone servers based on the processed user data of a corresponding zone server of the plurality of zone servers, wherein
the specific zone server is different from the corresponding zone server,
a specific gate controller of the plurality of gate controllers subsequently reads the identification data from the storage device based on the prediction of the specific zone server, and
the specific gate controller is associated with the specific zone server; and
supply the processed user data to the specific zone server, and each of the plurality of gate controllers is configured to:
acquire the identification data from the storage device that stores the identification data; and
supply the acquired identification data.

2. An information processing method, comprising:
in an information processing system that includes
at least one center servers,
a plurality of zone servers, wherein each of the at least one center server is associated with at least one zone server of the plurality of zone servers, and
a plurality of gate controllers, wherein
each of the plurality of gate controllers is associated with a respective zone server of the plurality of zone servers, and
the plurality of gate controllers communicates with a storage device:
managing, by each of the at least one center server, user data based on identification data, wherein the identification data corresponds to identification of the storage device;
acquiring, by each of the plurality of zone servers, the user data that corresponds to the identification data, wherein the acquired user data is based on prediction data that corresponds to the identification data;
acquiring, by each of the plurality of gate controllers, the identification data from the storage device that stores the identification data;

supplying, by each of the plurality of gate controllers, the acquired identification data;

acquiring, by each of the plurality of zone servers, the identification data from a respective gate controller of the plurality of gate controllers;

processing, by each of the plurality of zone servers, the acquired user data that corresponds to the acquired identification data;

predicting, by each of the plurality of zone servers, a specific zone server of the plurality of zone servers based on the processed user data of a corresponding zone server of the plurality of zone servers, wherein the specific zone server is different from the corresponding zone server, a specific gate controller of the plurality of gate controllers subsequently reads the identification data from the storage device based on the prediction of the specific zone server, and the specific gate controller is associated with the specific zone server; and supplying, by each of the plurality of zone servers, the processed user data to the specific zone server.

3. A first information processing device comprising:
a central processing unit (CPU) configured to:
acquire user data that corresponds to identification data, wherein the user data is based on prediction data that corresponds to the identification data;
acquire the identification data, wherein
the acquired identification data is supplied from a first gate controller of at least one first gate controller,
the at least one first gate controller is associated with the first information processing device,
the first gate controller reads the identification data from a storage device that stores the identification data, and
the identification data corresponds to identification of the storage device;
process the acquired user data that corresponds to the identification data acquired from the first gate controller;
predict a second information processing device based on the processed user data, wherein
a second gate controller of at least one second gate controller subsequently reads the identification data from the storage device based on the prediction of the second information processing device, and
the at least one second gate controller is associated with the second information processing device; and
supply the processed user data to the second information processing device.

4. The first information processing device according to claim 3, wherein
the CPU is further configured to acquire the user data that is supplied, based on the prediction data, from a third information processing device,
the third information processing device is associated with at least one center servers, and
a third information processing device is associated with at least one third gate controller.

5. The first information processing device according to claim 3, wherein
the CPU is further configured to acquire the user data that is supplied, based on the prediction data, from a specific center server of at least one center server, and the at least one center server is associated with the first information processing device.

6. The first information processing device according to claim 3, wherein
the CPU is further configured to acquire the user data from a specific center server of at least one center server,
the at least one center server is associated with the first information processing device, and
the user data that corresponds to the identification data acquired from the first gate controller is not supplied.

7. The first information processing device according to claim 3, wherein
the prediction data is for prediction of the first information processing device that includes the first gate controller, and
the first gate controller subsequently reads the identification data from the storage device.

8. The first information processing device according to claim 7, wherein
the prediction data is associated with a behavior history of a user of the storage device that stores the identification data, and
the user data is based on the prediction data.

9. The first information processing device according to claim 7, wherein
the prediction data is associated with a commutation ticket of a user of the storage device that stores the identification data, and
the user data is based on the prediction data.

10. The first information processing device according to claim 3, wherein
the user data includes the identification data and first data that is associated with a history of entrance and exit of a user of the storage device, and
the CPU is further configured to update the first data.

11. The first information processing device according to claim 10, wherein
the user data further includes second data associated with an amount of registered electronic money,
the amount of registered electronic money is associated with the storage device,
the CPU is further configured to update the second data based on one of the entrance or the exit of the user, and
one of the entrance or the exit of the user corresponds to the identification data acquired from the first gate controller.

12. The first information processing device according to claim 11, wherein
the user data further includes third data associated with a commutation ticket, and
the CPU is further configured to update the second data based on the third data and one of the entrance or the exit of the user, wherein the user data of the user further includes the updated second data.

13. The first information processing device according to claim 3, wherein
the CPU is further configured to supply the processed user data to a specific center server of at least one center server, and
the at least one center server is associated with the first information processing device.

14. The first information processing device according to claim 3, wherein
the user data includes first data associated with a history of entrance and exit of a user of the storage device, and the CPU is further configured to:
    acquire second data associated with the history of the entrance and the exit of the user from the first gate controller, wherein the first gate controller reads the second data from the storage device; and
    update the first data and the second data.

15. The first information processing device according to claim 3, wherein
    the user data includes first data associated with an amount of registered electronic money,
    the amount of registered electronic money is associated with the storage device, and
    the CPU is further configured to:
        acquire second data associated with the amount of the registered electronic money from the first gate controller, wherein the first gate controller reads the second data from the storage device; and
        update the first data and the second data.

16. The first information processing device according to claim 15, wherein
    the user data further includes third data associated with a commutation ticket, and
    the CPU is further configured to update the first data and the second data that based on the third data and one of entrance or exit of a user of the storage device.

17. The first information processing device according to claim 3, wherein a physical area associated with the first gate controller is different from a physical area associated with the second gate controller.

18. The first information processing device according to claim 3, wherein the CPU is further configured to store the user data in the first information processing device.

19. An information processing method, comprising:
    in a first information processing device:
    acquiring user data that corresponds to identification data, wherein the user data is based on prediction data that corresponds to the identification data;
    acquiring the identification data, wherein
        the acquired identification data is supplied from a first gate controller of at least one first gate controller,
        the at least one first gate controller is associated with the first information processing device,
        the first gate controller reads the identification data from a storage device that stores the identification data, and
        the identification data corresponds to identification of the storage device;
    processing the acquired user data that corresponds to the acquired identification data;
    predicting a second information processing device based on the processed user data, wherein
        a second gate controller of at least one second gate controller subsequently reads the identification data from the storage device based on the prediction of the second information processing device, and
        the at least one second gate controller is associated with the second information processing device; and
    supplying the processed user data to the second information processing device.

\* \* \* \* \*